United States Patent
Sato et al.

(10) Patent No.: US 6,466,403 B1
(45) Date of Patent: Oct. 15, 2002

(54) THIN FILM MAGNETIC HEAD HAVING VERY NARROW TRACK WIDTH AND MANUFACTURING METHOD FOR THE SAME

(75) Inventors: Kiyoshi Sato, Niigata-ken (JP); Toshihiro Kuriyama, Niigata-ken (JP); Toshinori Watanabe, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/532,750

(22) Filed: Mar. 22, 2000

(30) Foreign Application Priority Data

Mar. 24, 1999 (JP) .................................... 11-080551

(51) Int. Cl.$^7$ ............................................. G11B 5/147
(52) U.S. Cl. ...................................... 360/126; 360/125
(58) Field of Search ............................ 360/126, 125, 360/122, 128, 129

(56) References Cited

U.S. PATENT DOCUMENTS

| | | | | |
|---|---|---|---|---|
| 5,402,294 A | * | 3/1995 | Gooch et al. | 360/125 |
| 5,452,164 A | | 9/1995 | Cole et al. | 360/113 |
| 5,649,351 A | | 7/1997 | Cole et al. | 29/603.14 |
| 5,652,687 A | | 7/1997 | Chen et al. | 360/126 |
| 5,802,700 A | | 9/1998 | Chen et al. | 29/603.14 |
| 6,055,138 A | * | 4/2000 | Shi | 360/126 |
| 6,072,670 A | * | 6/2000 | Furuichi et al. | 360/126 |
| 6,137,652 A | * | 10/2000 | Ezaki et al. | 360/113 |
| 6,180,421 B1 | * | 1/2001 | Futai et al. | 438/3 |

* cited by examiner

Primary Examiner—Allen Cao
Assistant Examiner—Dzung Nguyen
(74) Attorney, Agent, or Firm—Brinks Hofer Gilson & Lione

(57) ABSTRACT

The present invention provides a thin film magnetic head having a recording track width of 1 μm or less, and a method for manufacturing the thin film magnetic head having a recording track width of 1 μm or less. In the thin film magnetic head, an upper core layer and a lower core layer extend from a back region toward a magnetic pole tip region, and are exposed at a medium opposing surface, and a gap layer is provided, in the magnetic pole tip region, between the upper core layer and the lower core layer. An insulation layer is deposited on the lower core layer, and a groove that extends from the medium opposing surface toward the back region is provided in the magnetic pole tip region of the insulation layer. A lower magnetic pole layer, the gap layer, and an upper magnetic pole layer are deposited in the groove. The lower magnetic pole layer is joined to the lower core layer, while the upper magnetic pole layer is joined to the upper core layer.

12 Claims, 20 Drawing Sheets

THIN FILM MAGNETIC HEAD HAVING VERY NARROW TRACK WIDTH AND MANUFACTURING METHOD FOR THE SAME

BACKGROUND OF THE INVENTION

1. Field of the Invention

The present invention relates to a thin film magnetic head and a manufacturing method for the same and, more particularly, to a thin film magnetic head having a very narrow track width of 1 μm or less, and a manufacturing method for the same.

2. Description of the Related Art

FIG. 26 shows a conventional flying magnetic head 150.

The flying magnetic head 150 is primarily constructed by a slider 151 and a composite thin film magnetic head 157 provided on the slider 151. Reference numeral 155 denotes a reading end of the slider 151 that is an upstream end of a direction in which a magnetic recording medium moves, while reference numeral 156 denotes a trailing end. Rails 151a, 151a, and 151b are formed on a medium opposing surface 152 of the slider 151, air grooves 151c and 151c being provided between the rails.

The composite thin film magnetic head 157 is provided on an end surface 151d at the trailing end 156 of the slider 151.

Referring to FIGS. 27 and 28, the composite thin film magnetic head 157 is comprised of an MR magnetic head h1 equipped with a magnetoresistive device and a thin film magnetic head h2, which is a write head. These magnetic heads h1 and h2 are deposited on the end surface 151d of the slider 151.

The MR magnetic head h1 is comprised of a lower shield layer 163 that is formed on the end surface 151d of the slider 151 and composed of a magnetic alloy, a read gap layer 164 deposited on the lower shield layer 163, a magnetoresistive device 165 exposed on the medium opposing surface 152, an upper shield planarizing gap layer 166 covering the magnetoresistive device 165 and the read gap layer 164, and an upper shield layer 167 covering the upper shield planarizing gap layer 166.

The upper shield layer 167 serves also as a lower core layer of the thin film magnetic head h2.

The MR magnetic head h1 is employed as a read magnetic head. When a minute leakage magnetic field from a magnetic recording medium is applied to the magnetoresistive device 165, resistance in the magnetoresistive device 165 changes. A voltage change based on the change in the resistance is read as a reproduction signal of the magnetic recording medium by the MR magnetic head h1.

The thin film magnetic head h2 is formed of a lower core layer or the upper shield layer 167, a gap layer 174 deposited on the lower core layer 167, a coil 176 formed in a back region Y of the gap layer 174, an upper insulation layer 177 covering the coil 176, and an upper core layer 178 that is joined to the gap layer 174 in a magnetic pole tip region X and joined to the lower core layer 167 in the back region Y.

The coil 176 is patterned so that it is flatly spiral. In a substantially central portion of the coil 176, a proximal end portion 178b of the upper core layer 178 is magnetically connected to the lower core layer 167.

A protective layer 179 composed of alumina or the like is deposited on the upper core layer 178.

The lower core layer 167, the gap layer 174, and the upper core layer 178 extend from the back region Y toward the magnetic pole tip region X in the composite thin film magnetic head 157, and are exposed on the medium opposing surface 152. In the medium opposing surface 152, the upper core layer 178 and the lower core layer 167 face each other with the gap layer 174 sandwiched therebetween, forming a magnetic gap.

The magnetic pole tip region X is an area where the upper core layer 178 and the lower core layer 167 are separated by only the gap layer 174 sandwiched therebetween in the vicinity of the medium opposing surface 152. The back region Y refers to an area excluding the magnetic pole tip region X.

The foregoing thin film magnetic head h2 is used as a write head. When a recording current is applied to the coil 176, magnetic fluxes are generated in the upper core layer 178 and the lower core layer 167 by the recording current. The magnetic fluxes leak out through the magnetic gap to produce a leakage magnetic field, and the leakage magnetic field causes the magnetic recording medium to be magnetized to thereby record a recording signal.

To fabricate the thin film magnetic head h2, the lower core layer 167, the gap layer 174, and the upper core layer 178 are formed in this order by a depositing pattern in advance. In this case, the upper core layer 178 is processed according to a frame plating method using plating and ion milling. A width of the upper core layer 178 exposed to the medium opposing surface 152 is determined by a resist width in the frame plating method or the like, the plating, and an etching method, and the width of the upper core layer 178 exposed on the medium opposing surface 152 determines a magnetic recording track width.

Thus, a track width of a magnetic recording medium can be reduced by providing a smaller magnetic recording track width of the thin film magnetic head h2, i.e., the width of the upper core layer 178 at the magnetic pole tip exposed on the medium opposing surface. This makes it possible to achieve a higher track density of the magnetic recording medium, consequently permitting a higher recording density.

In the conventional thin film magnetic head h2, however, the upper core layer is thick. Therefore, even when the layers are accurately formed by the frame plating or other means and the magnetic pole tip is processed with the highest possible processing accuracy currently available, it is difficult to accomplish a recording track width of 1 μm or less due to a limited resolution of exposure when forming a resist pattern. This has been a problem in that a further higher recording density of a magnetic recording medium cannot be achieved.

SUMMARY OF THE INVENTION

Accordingly, the present invention has been made with a view toward solving the problem described above, and it is an object thereof to provide a thin film magnetic head having a recording track width of 1 μm or less. It is another object thereof to provide a method for manufacturing a thin film magnetic head having a recording track width of 1 μm or less.

To fulfill the foregoing objects, the present invention adopts the following configurations.

According to one aspect of the present invention, there is provided a thin film magnetic head including: an upper core layer and a lower core layer that extend from a back region toward a magnetic pole tip region, end surfaces thereof being exposed on a medium opposing surface, and the upper core layer and the lower core layer being magnetically connected in the back region; and a gap layer provided between the upper core layer and the lower core layer in the magnetic pole tip region; wherein an insulation layer is deposited on the lower core layer; a groove extending from the medium opposing surface toward the back region is provided in the magnetic pole tip region of the insulation layer, the groove being composed of a groove main body that opens to the lower core layer, the upper core layer, and the medium opposing surface, and a slant portion formed in the opening of the groove main body at the end of the upper core layer; a lower magnetic pole layer, the gap layer, and an upper magnetic pole layer are deposited in the groove; and the lower magnetic pole layer is joined to the lower core layer, while the upper magnetic pole layer is joined to the upper core layer, the upper magnetic pole layer forming an upper magnetic pole tip, while the lower magnetic pole layer forms a lower magnetic pole tip.

In a preferred form of the present invention, the groove main body of the thin film magnetic head is equipped with two side walls that are installed in a standing manner on the lower core layer and reach the medium opposing surface, and a magnetic pole tip surface that connects the two side walls at the back region side of the groove main body and defines gap depths of the upper magnetic pole tip and the lower magnetic pole tip.

In another preferred form of the present invention, the slant portion is composed of two slant surfaces near the side walls and a magnetic pole tip slant surface that continues to the magnetic pole tip surface.

In a further preferred form of the present invention, the lower magnetic pole layer and the gap layer are deposited in the groove main body, and the upper magnetic pole layer is deposited such that it extends over the groove main body and the slant portion.

In a further preferred form of the present invention, a top surface of the lower core layer is polished.

In the thin film magnetic head according to the present invention, the lower core layer and the lower magnetic pole layer make up a lower core, while the upper core layer and the upper magnetic pole layer make up an upper core. Furthermore, the lower magnetic pole layer, the gap layer, and the upper magnetic pole layer make up a magnetic gap, and the magnetic gap lies between the upper core and the lower core.

A part of the lower magnetic pole layer, the gap layer, and the upper magnetic pole layer that constitute the magnetic gap is deposited in the groove main body formed beforehand, so that a recording track width is decided by a width of the groove main body. Hence, the recording track width can be reduced by reducing the width of the groove main body.

Moreover, in the thin film magnetic head according to the present invention, the gap depth of the magnetic gap is defined by a distance from the medium opposing surface to a magnetic pole tip surface of the groove main body, and a part of the lower magnetic pole layer, the gap layer, and the upper magnetic pole layer that constitute the magnetic gap is deposited in the groove main body, thus eliminating a possibility of variations in the gap depth.

The upper magnetic pole layer is deposited over the groove main body and the slant portion and joined to the upper core layer, so that a tapered portion is formed on the upper magnetic pole layer at the upper core layer side. The presence of the tapered portion ensures smooth flow of magnetic fluxes between the upper core layer and the upper magnetic pole layer, preventing the magnetic fluxes from leaking at a junction between the upper core layer and the upper magnetic pole layer.

The top surface of the lower core layer is polished to be a flat surface having a surface roughness of 0.001 $\mu$m to 0.015 $\mu$m. This enables the groove to be formed with high accuracy, thereby allowing the recording track width to be reduced.

It is also possible to reduce the gap between the side walls of the groove main body to 1 $\mu$m or less, and more preferably to 0.5 $\mu$m or less. Thus, the recording track width can be set to 1 $\mu$m or less.

Preferably, slope angles of the slant surfaces near the side walls range from 10 to 80 degrees with respect to the lower core layer in the thin film magnetic head in accordance with the present invention.

Preferably, a slope angle of the magnetic pole tip slant surface ranges from 10 to 80 degrees with respect to the lower core layer.

If the slope angles of the slant surfaces near the side walls are below 10 degrees, then a reactance between the upper core layer and the lower core layer will be undesirably reduced with a consequent increased leakage magnetic flux at an end of the magnetic recording track. Conversely, if the slope angles exceed 80 degrees, then the volume of the upper magnetic pole layer is reduced and a reactance of the upper magnetic pole layer is increased. This will undesirably lead to a loss in magnetic fluxes supplied from the upper core layer to the upper magnetic pole layer with a consequent reduction in an amount of effective magnetic fluxes in the magnetic gap.

Likewise, if the slope angle of the magnetic pole tip slant surface is below 10 degrees, then the reactance between the upper core layer and the lower core layer will be undesirably reduced with a consequent increase in a leakage magnetic field from the upper core layer to the upper magnetic pole layer in the vicinity of the magnetic pole tip slant surface. Conversely, if the slope angle of the magnetic pole tip slant surface exceeds 80 degrees, then a sectional configuration of the upper core layer cannot be smoothly formed, and a part of the sectional configuration of the upper core layer will have an acute angle. As a result, a large diamagnetic field undesirably increases in the vicinity of the acute angle, thus leading to lower recording efficiency.

Preferably, in the thin film magnetic head according to the present invention, the insulation layer, the lower magnetic pole layer, the gap layer, and the upper magnetic pole layer are exposed on the medium opposing surface. With this arrangement, the recording track width on the medium opposing surface coincides with the width of the groove main body of the insulation layer, so that the recording track width can be reduced. In addition, since the magnetic gap is exposed through the medium opposing surface, the leakage magnetic field produced from the magnetic gap permits efficient magnetic recording on a magnetic recording medium.

Preferably, the insulation layer is formed of a single-layer film composed of one of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN, or a multi-layer film wherein two or more different single-layer films are laminated. Forming the insulation layer by using the components mentioned above permits anisotropic etching to be carried out for forming the groove. This eliminates a possibility of side etching, thus enabling higher dimensional accuracy of the width of the groove, namely, the groove main body, especially in a direction of the depth of the groove.

Preferably, the gap layer is formed of a single-layer film composed of one of Au, Pt, Rh, Pd, Ru, Cr, a NiMo alloy, a NiW alloy, a NiP alloy, and NiPd alloy, or a multi-layer film wherein two or more different single-layer films are laminated.

All the above constituents are nonmagnetic and are not magnetized, making themselves ideally suited for constituting a gap layer of a thin film magnetic head. These constituents are metallic and can be deposited in a groove by an electroplating method using an underlying core layer as an electrode. Hence, the gap layer can be securely formed in the main body of the groove, enabling the width of the gap layer to agree with the width of the groove main body.

Preferably, the upper magnetic pole layer and the lower magnetic pole layer are formed of a single-layer film composed of one of a FeNi alloy, a FeNi alloy in which the concentration of Fe is higher than that of Ni, and a CoFeNi alloy, or a multi-layer film wherein two or more different single-layer films are laminated.

The above constituents are all magnetic constituents featuring superior soft magnetic characteristics and ideally suited for constituting a core of a thin film magnetic head. In addition, these constituents are metallic and can be deposited in the groove by the electroplating method using an underlying core layer as an electrode.

Furthermore, the composite thin film magnetic head in accordance with the present invention is composed of a read magnetic head equipped with a magnetoresistive device and the thin film magnetic head described above, these two magnetic heads being laminated.

According to another aspect of the present invention, there is provided a manufacturing method for a thin film magnetic head having an upper core layer and a lower core layer that extend from a back region toward a magnetic pole tip region to be exposed on a medium opposing surface, the upper core layer and the lower core layer being magnetically connected in the back region, and a gap layer provided between the upper core layer and the lower core layer in the magnetic pole tip region, the method including the steps of: polishing a top surface of the lower core layer to planarize it, and depositing an insulation layer on the lower core layer; forming, in the magnetic pole tip region of the insulation layer, a groove that extends from the medium opposing surface toward the back region, and making a bottom surface of the groove reach the lower core layer; depositing the lower magnetic pole layer, the gap layer, and the upper magnetic pole layer in the groove, and joining the lower core layer and the lower magnetic pole layer; forming a coil in the back region of the insulation layer, and joining the coil to the upper magnetic pole layer in the magnetic pole tip region; and forming the upper core layer that covers a part of the coil in the back region.

Preferably, the insulation layer is subjected to anisotropic etching to form the groove.

Polishing the lower core layer to planarize it leads to a flat insulation layer to be deposited in a subsequent step. This makes it possible to accurately form the groove by the anisotropic etching, permitting the recording track width to be reduced.

Forming the groove by the anisotropic etching prevents side etching, enabling improvement of the dimensional accuracy of the groove width in relation to the direction of the groove depth.

Preferably, when forming the groove, a mask layer is deposited on the insulation layer, a pattern is formed on the mask layer, and the anisotropic etching is performed on the insulation layer exposed through the pattern.

The anisotropic etching is most preferably performed by a reactive ion etching method. This allows the groove to be formed with high dimensional accuracy.

Preferably, the mask layer is one of a photoresist layer, a metal film layer, a laminate composed of a photoresist layer and a metal film layer, and a metal oxide layer.

The photoresist layer may be a standard positive or negative photoresist, or a photoresist that can be exposed by far ultraviolet rays, electron beams, X-rays, ion beams, or the like.

The metal film layer is preferably composed of one or more of Ti, Zr, Nb, Ta, Cr, Mo, W, Ru, Co, Rh, Ir, Ni, Pd, Pt, Au, Al, In, and Si, and may be formed of a single-layer film or a multi-layer film composed of the single-layer films.

The metal oxide layer is preferably composed of one or more of $SiO$, $SiO_2$, $TaO$, $Ta_2O_5$, $TiO$, $SiN$, $Si_3N_4$, $CrO$, $WO$, $ZrO$, $NiO$, $AlO$, and $IrO$, and may be formed of a single-layer film or a multi-layer film composed of the single-layer films.

A reactant gas used for forming the groove by the reactive ion etching method is preferably composed of one or more of $CF_4$, a mixed gas of $CF_4$ and $O_2$, $C_2F_6$, a mixed gas of $C_2F_6$ and $O_2$, $C_4F_6$, a mixed gas of $C_4F_6$ and $O_2$, $Cl_2$ $BCl_3$, a mixed gas of $Cl_2$ and $BCl_3$, $CHF_3$, and a mixed gas of $CHF_3$ and Ar. Among these reactant gases, a best suited one is selected based on constituents of the insulation layer and the mask layer.

In the manufacturing method for a thin film magnetic head in accordance with the present invention, it is preferable to apply an ion beam to a portion where the top surface of the insulation layer and the groove are connected, to perform etching after forming the groove thereby to form a groove main body that opens to the lower core layer, the upper core layer, and the medium opposing surface and to form a slant portion in an opening of the groove main body at the end of the upper core layer.

Preferably, the slant portion on the insulation layer is formed by performing reactive etching under a condition for taper-edging a resist.

Preferably, the lower magnetic pole layer and the gap layer are deposited on the groove main body, and the upper magnetic pole layer is deposited over the groove main body and the slant portion.

Preferably, the lower magnetic pole layer, the gap layer, and the upper magnetic pole layer are formed by the electroplating method using the lower core layer as an electrode.

In the manufacturing method for a thin film magnetic head according to the present invention, a coil insulation layer having a slant surface that inclines toward the magnetic pole tip slant surface is formed between the insulation layer and the coil.

DESCRIPTION OF THE PREFERRED EMBODIMENTS

Figure 1:
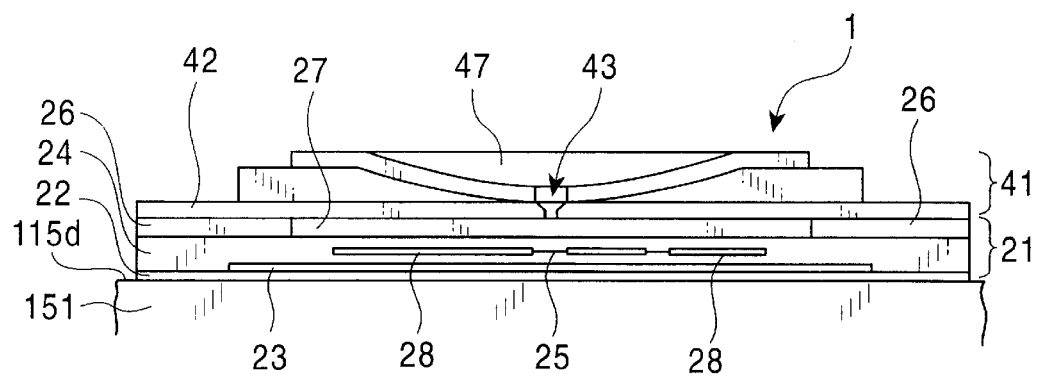
FIG. 1 is a front view of a composite thin film magnetic head that is an embodiment in accordance with the present invention.
Figure 2:
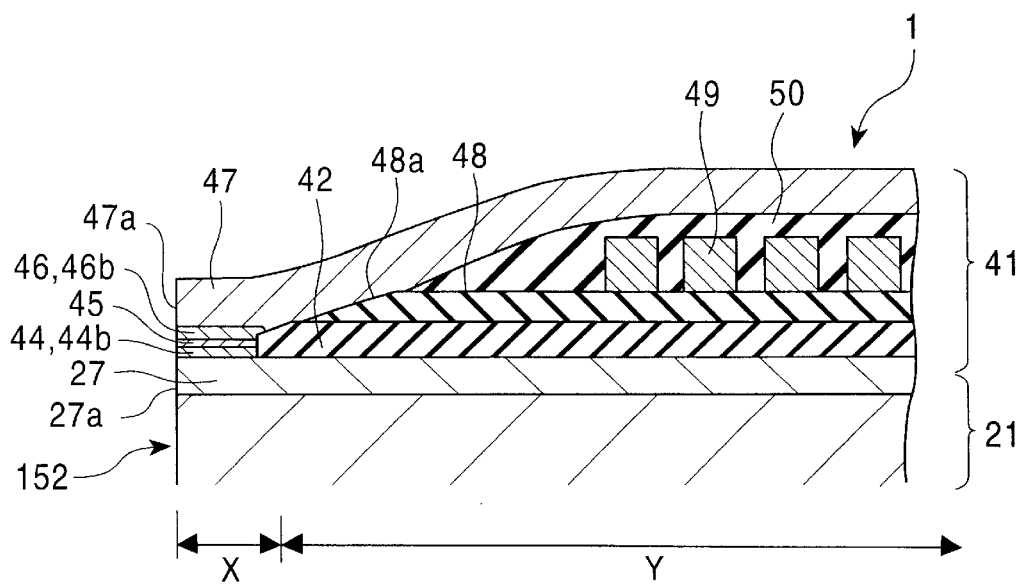
FIG. 2 is a side sectional view showing a thin film magnetic head, in accordance with the present invention.
Figure 26:
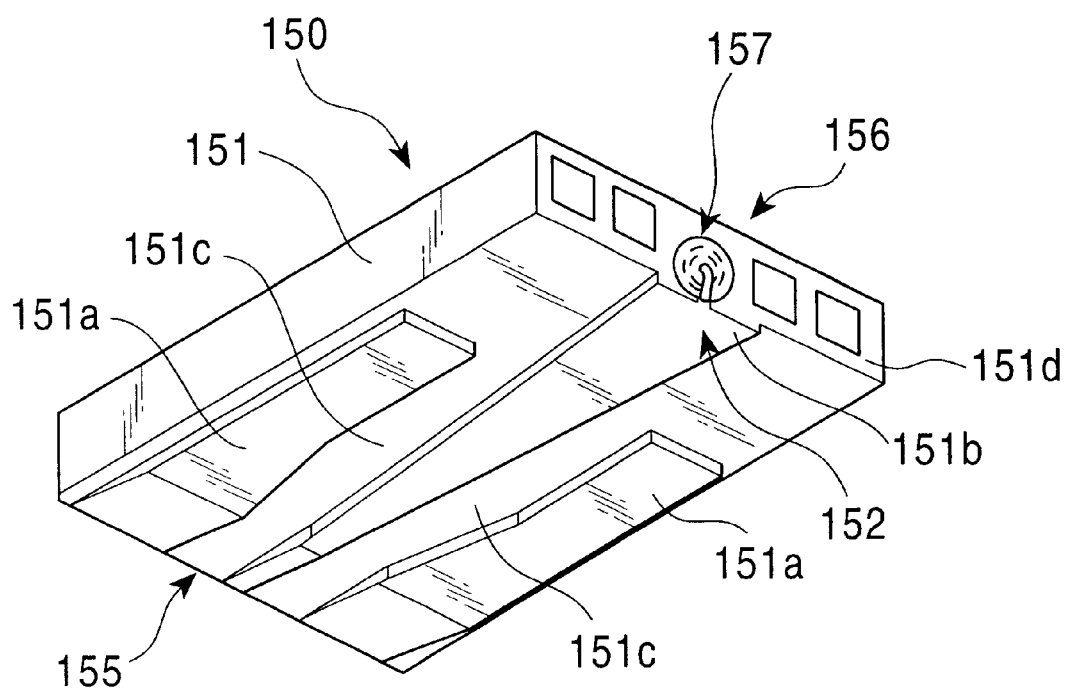
FIG. 26 is a perspective view showing a conventional flying magnetic head.
Figure 27:
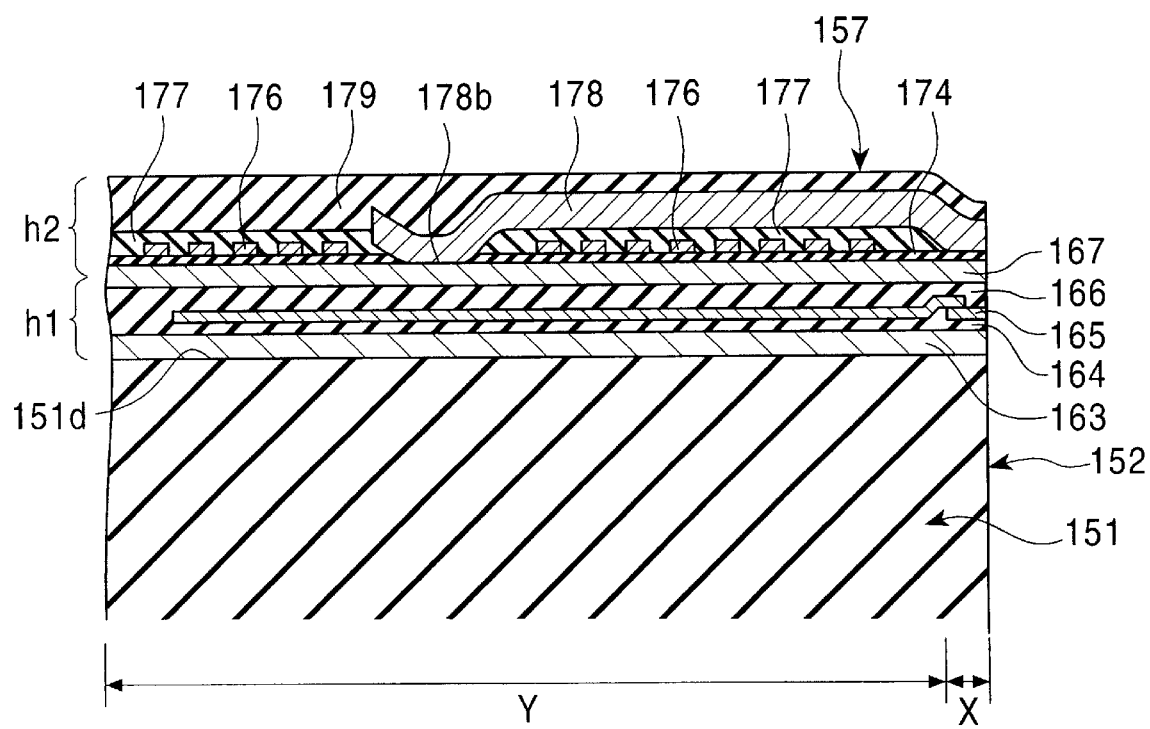
FIG. 27 is a side sectional view showing a conventional composite thin film magnetic head.
Figure 28:
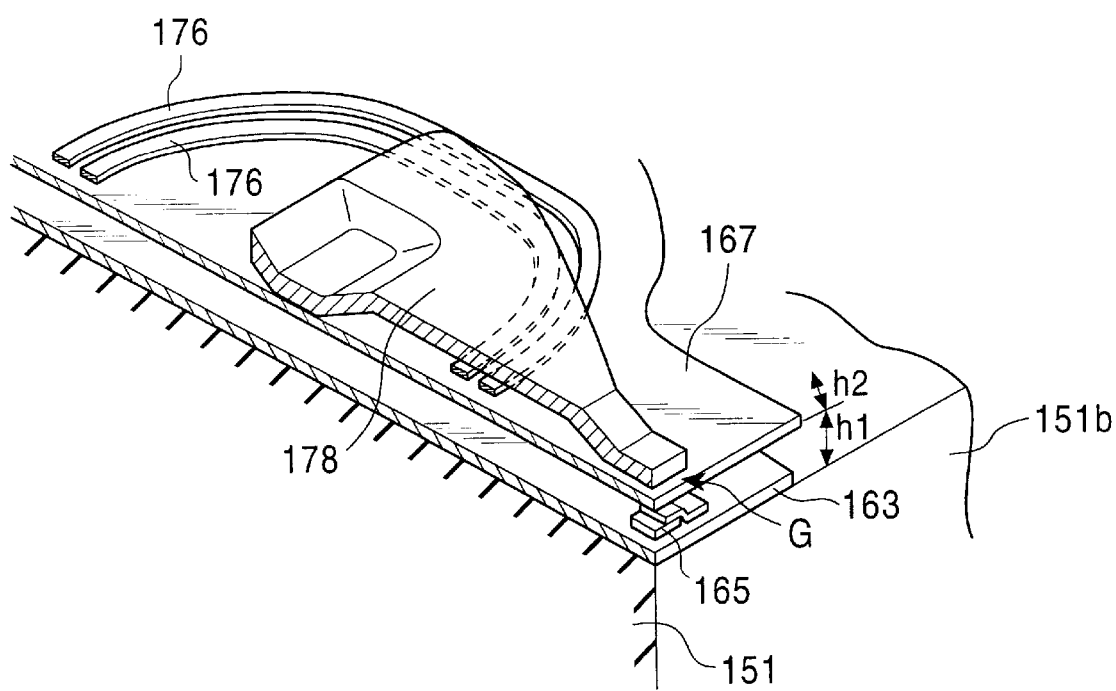
FIG. 28 is a perspective view showing a conventional composite thin film magnetic head.

The following will describe embodiments of the present invention with reference to the accompanying drawings. FIGS. 1 and 2 show a composite thin film magnetic head in accordance with the present invention. In these drawings, like components as those shown in FIGS. 26 through 28 will be assigned like reference numerals and descriptions thereof will be omitted.

Referring to FIG. 1, a composite thin film magnetic head 1 in accordance with the present invention is formed by a read magnetic head equipped with a magnetoresistive device (an MR magnetic head or a GMR magnetic head) 21 and a thin film magnetic head (a write inductive head) 41, which are laminated on an end surface 151d of a slider 151.

As illustrated in FIG. 1, the read magnetic head 21 is comprised of a substrate insulation layer 22 formed on the end surface 151d of the slider 151, a lower shield layer 23 that is deposited on the substrate insulation layer 22 and made of a magnetic alloy, a read gap layer 24 that is provided so that it holds the read magnetic head 21, which is deposited on the lower shield layer 23, to define a shielding interval of the read magnetic head 21, a magnetoresistive device 25 that is buried in the read gap layer 24 and partly exposed on a medium opposing surface, an upper shield planarizing gap layer 26 deposited on the read gap layer 24, and an upper shield layer 27 buried in the upper shield planarizing gap layer 26. The upper shield layer 27 serves also as a lower core layer of the thin film magnetic head 41. Preferably, the upper shield layer or the lower core layer 27 is formed of a soft magnetic alloy composed of a FeNi alloy, a FeCoNi alloy, or the like, and the upper shield layer is formed of a single-layer film or a multi-layer film of the single-layer films.

End surfaces of all the lower shield layer 23, the read gap layer 24, the upper shield planarizing gap layer 26, the upper shield layer 27, and the magnetoresistive device 25 are exposed at a medium opposing surface 152.

The electrode layers 28 and 28 for supplying sense currents are connected to the magnetoresistive device 25.

The magnetoresistive device 25 may be a so-called giant magnetoresistive device (GMR device) in addition to a soft magnetic constituent having the magnetoresistance effect.

In the aforesaid read magnetic head 21, a minute leakage magnetic field from a magnetic recording medium is applied to the magnetoresistive device 25, causing a resistance of the magnetoresistive device 25 to change. A voltage change based on the resistance change is read as a reproduction signal of the magnetic recording medium.

In the thin film magnetic head 41 in accordance with the present invention shown in FIGS. 1 through 5, an insulation layer 42 is deposited on the lower core layer (or the upper shield layer) 27, and a groove 43 that extends from the medium opposing surface 152 toward a back region Y is provided in a magnetic pole tip region X of the insulation layer 42. A lower magnetic pole layer 44, a gap layer 45, and an upper magnetic pole layer 46 are deposited in the groove 43, the lower magnetic pole layer 44 is joined to the lower core layer 27, and an upper magnetic pole layer 46 is joined to an upper core layer 47 so that the upper magnetic pole layer 46 constitutes an upper magnetic pole tip 46b and the lower magnetic pole layer 44 constitutes a lower magnetic pole tip 44b.

Referring back to FIG. 2, the upper core layer 47 and the lower core layer 27 extend from the back region Y toward the magnetic pole tip region X, their end surfaces 47a and 27a being exposed at the medium opposing surface 152. The upper core layer 47 and the lower core layer 27 are magnetically joined in the back region Y.

The magnetic pole tip region X refers to an area wherein the upper core layer 47 and the lower core layer 27 face each other with the gap layer 45 sandwiched therebetween in the vicinity of the medium opposing surface 152, while the back region Y refers to an area excluding the magnetic pole tip region X as shown in FIG. 2.

Figure 3:
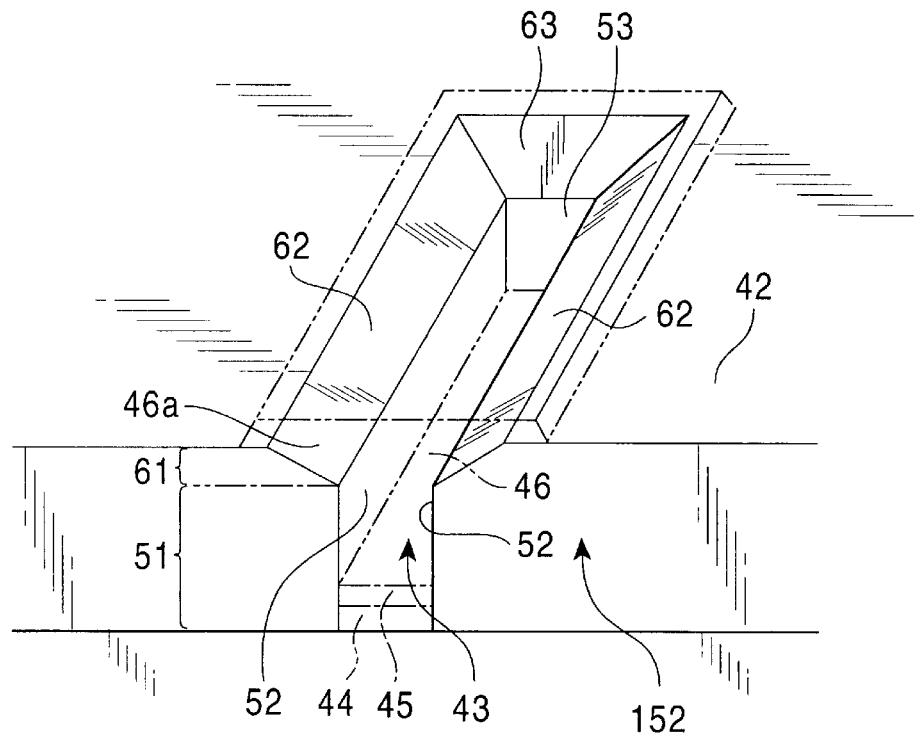
FIG. 3 is a perspective view showing an essential section of a magnetic pole tip region of the thin film magnetic head, in accordance with the present invention.
Figure 4:
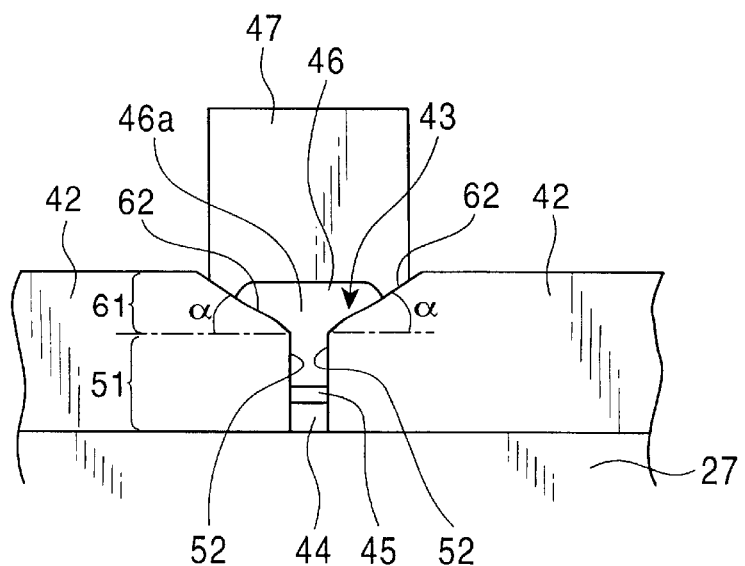
FIG. 4 is a front view showing an essential section of the magnetic pole tip region of the composite thin film magnetic head, in accordance with the present invention.

Referring to FIGS. 3 and 4, the groove 43 is formed of a groove main body 51 that opens to the lower core layer 27, the upper core layer 47, and the medium opposing surface 152, and a slant portion 61 formed in an opening of the groove main body 51, the opening being adjacent to the upper core layer 47.

The groove main body 51 is divided into at least two side walls 52 and 52 that are provided on the lower core layer 27 in a standing manner and reach the medium opposing surface 152, and a magnetic pole tip surface 53 that connects the two side walls 52 and 52 in the back region Y of the groove main body 51 to define gap depths of the upper magnetic pole tip 46b and the lower magnetic pole tip 44b.

The slant portion 61 is divided into at least two side wall slant surfaces 62 and 62 that are connected to the side wall surfaces 52 and inclined outward in a width direction of the groove main body 51, and a magnetic pole tip slant surface 63 that is connected to the magnetic pole tip surface 53 and inclined toward the back region Y.

The lower magnetic pole layer 44 and the gap layer 45 are positioned and deposited in the groove main body 51, the lower magnetic pole layer 44 being joined to the lower core layer 27.

The upper magnetic pole layer 46 is deposited over the groove main body 51 and the slant portion 61, and joined to the upper core layer 47.

The insulation layer 42, the lower magnetic pole layer 44, the gap layer 45, and the upper magnetic pole layer 46 are exposed at the medium opposing surface 152.

With the arrangement described above, a recording track width in the medium opposing surface 152 coincides with a width of the groove 43, allowing the recording track width to be reduced. Furthermore, since the magnetic gap is exposed at the medium opposing surface 152, magnetic recording on a magnetic recording medium can be efficiently accomplished by a magnetic field leaking through the magnetic gap.

In the thin film magnetic head 41 according to the present invention, the lower core layer 27 and the lower magnetic pole layer 44 make up the lower core, the upper core layer 47 and the upper magnetic pole layer 46 make up the upper core, and the lower magnetic pole layer 44, the gap layer 45, and the upper magnetic pole layer 46 make up the magnetic gap. The magnetic gap is provided between the upper core and the lower core.

A part of the lower magnetic pole layer 44, the gap layer 45, and the upper magnetic pole layer 46 making up the magnetic gap is deposited in the groove main body 51 that is formed in advance. Therefore, the recording track width is decided by a width of the groove main body 51. This makes it possible to reduce the recording track width by reducing the width of the groove main body 51.

Moreover, in the thin film magnetic head 41 in accordance with the present invention, the gap depth of the magnetic gap is defined by a distance from the medium opposing surface 152 to the magnetic pole tip surface 53 of the groove main body 51, and the lower magnetic pole layer 44, the gap layer 45, and the upper magnetic pole layer 46 making up the magnetic gap are partly deposited in the groove main body 51. This arrangement eliminates the possibility of variations in the gap depth.

Moreover, in the foregoing thin film magnetic head 41, the upper magnetic pole layer 46 is deposited over the groove main body 51 and the slant portion 61 and joined to the upper core layer 47, so that a tapered portion 46a is formed on the upper magnetic pole layer 46 at the upper core layer 47 side. The presence of the tapered portion 46a ensures a smooth flow of magnetic fluxes between the upper core layer 47 and the upper magnetic pole layer 46, preventing the magnetic fluxes from leaking through a junction between the upper core layer 47 and the upper magnetic pole layer 46.

Preferably, the width of the groove main body 51 is set to 1 µm or less, and more preferably, 0.5 µm or less; therefore, the recording track width can be reduced to 1 µm or less.

As shown in FIG. 4, slope angles a of the slant surfaces 62 adjacent to the side walls preferably range from 10 to 80 degrees with respect to a top surface of the lower core layer 27.

Figure 5:
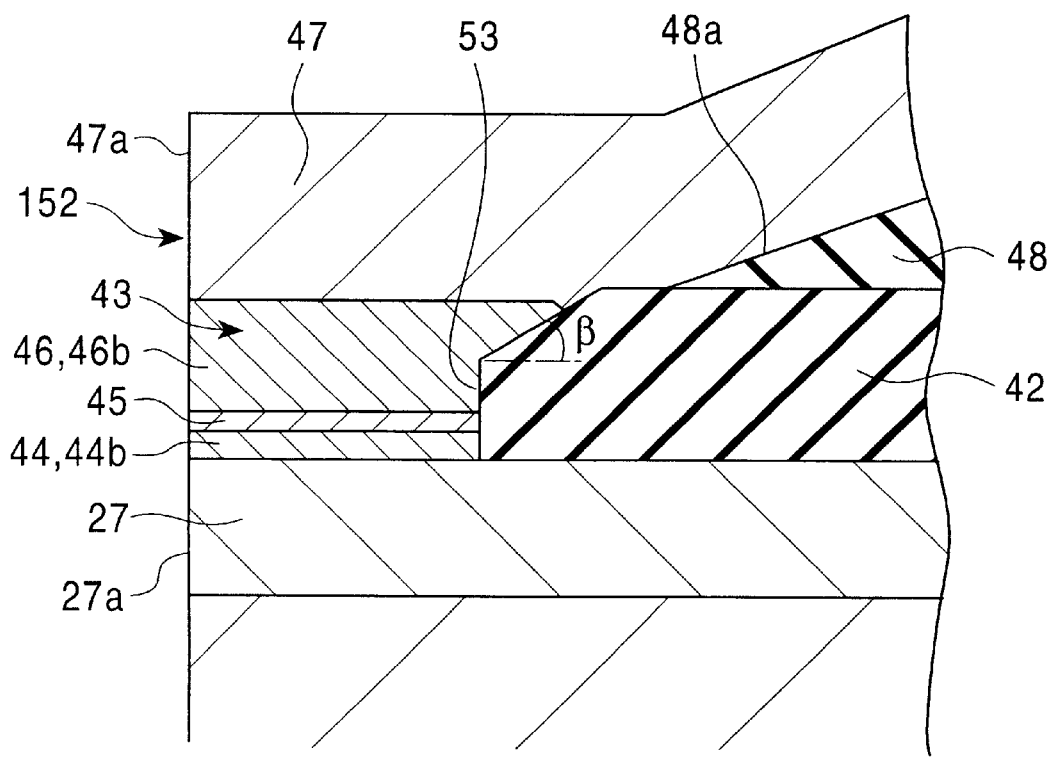
FIG. 5 is a side sectional view showing an essential section of a magnetic pole tip region of a composite thin film magnetic head, in accordance with the present invention.

Furthermore, as shown in FIG. 5, slope angles β of the magnetic pole tip slant surface 63 preferably ranges from 10 to 80 degrees with respect to the top surface of the lower core layer 27.

If the slope angles of the slant surfaces 62 adjacent to the side walls are below 10 degrees, then a reactance between the upper core layer 47 and the lower core layer 27 undesirably becomes small, resulting in an increased leakage magnetic flux at an end of a magnetic recording track. Conversely, if the slope angles exceed 80 degrees, then a volume of the upper magnetic pole layer 46 undesirably reduces and the reactance of the upper magnetic pole layer 46 increases. This causes a loss in magnetic fluxes supplied from the upper core layer 47 to the upper magnetic pole layer 46, and an amount of effective magnetic flux through the magnetic gap reduces.

Likewise, if the slope angle of the magnetic pole tip slant surface 63 is below 10 degrees, then the reactance between the upper core layer 47 and the lower core layer 27 will be undesirably reduced with a consequent increase in a leakage magnetic field from the upper core layer 47 to the upper magnetic pole layer 46 in the vicinity of the magnetic pole tip slant surface 63. Conversely, if the slope angle exceeds 80 degrees, then a sectional configuration of the upper core layer 47 cannot be smoothly formed, and a part of the sectional configuration of the upper core layer 47 will have an acute angle. As a result, a large diamagnetic field undesirably increases in the vicinity of the acute angle, thus leading to lower recording efficiency.

Referring back to FIGS. 2 and 5, a coil insulation layer 48 is deposited on the insulation layer 42. A top surface of the coil insulation layer 48 at a side of the magnetic pole tip region X provides a slant surface 48a that inclines toward the magnetic pole tip slant surface 63.

A coil 49 is formed on the coil insulation layer 48. In addition, an upper insulation layer 50 that covers the coil insulation layer 48 and the coil 49 is deposited.

The coil 49 is patterned so that it is flatly spiraled on the coil insulation layer 48.

The upper core layer 47 is formed so that it covers the upper magnetic pole layer 46, the slant surface 48a of the coil insulation layer 48, and the upper insulation layer 50, and covers the coil 49 via the upper insulation layer 50.

The coil insulation layer 48 is provided between the insulation layer 42 and the coil 49, providing sufficient magnetic insulation between the lower core layer 27 and the upper core layer 47. The slant surface 48a that inclines toward the magnetic pole tip slant surface 63 is formed on the coil insulation layer 48. This arrangement ensures smooth flow of magnetic fluxes from the upper core layer 47 to the upper magnetic pole layer 46, reducing leakage magnetic fields from the upper core layer 47 to the lower core layer 27 in the back region Y, permitting higher recording efficiency and improved overwrite characteristics.

Figure 29:
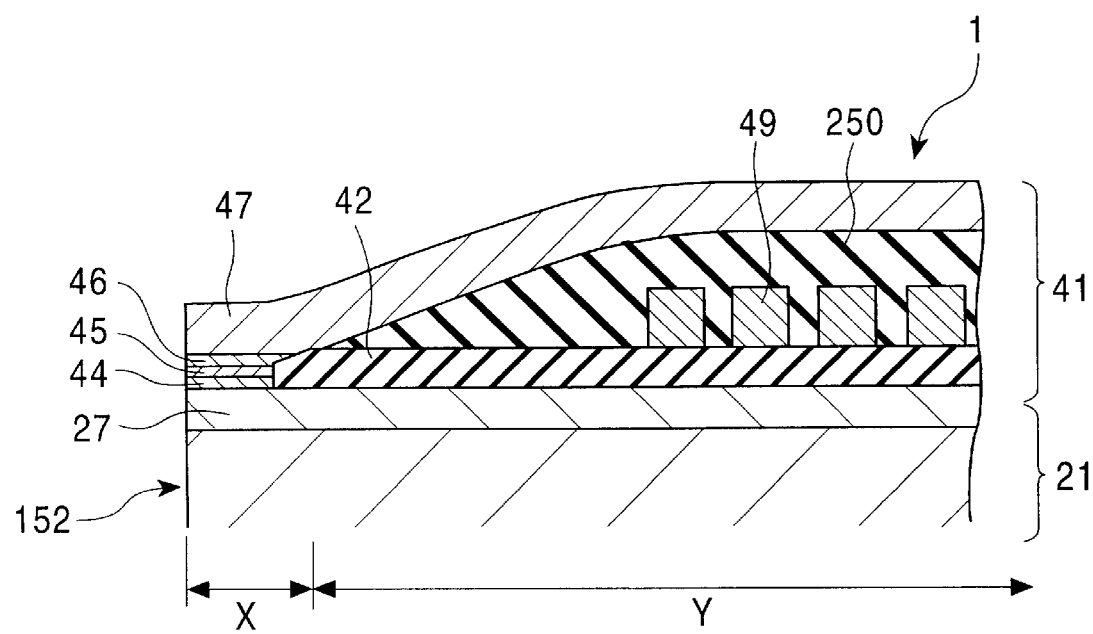
FIG. 29 is a side sectional view showing another embodiment of a thin film magnetic head, in accordance with the present invention.

As shown in FIG. 29, the coil 49 may be formed on the insulation layer 42, omitting the coil insulation layer 48, and an upper insulation layer 250 that covers the insulation layer 42 and the coil 49 may be formed. In this case, forming a top surface of the upper insulation layer 250 at the magnetic pole tip region X side into the slant surface that inclines toward the magnetic pole tip slant surface 63 enables the upper insulation layer 250 to implement a function of the coil insulation layer 48 shown in FIG. 2. Moreover, the elimination of the coil insulation layer 48 permits a reduced number of manufacturing steps.

Preferably, the insulation layer 42 is formed of a single-layer film composed of one of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN, or a multi-layer film wherein two or more different single layer films are laminated. Forming the insulation layer 42 by using the components mentioned above permits anisotropic etching to be carried out for forming the groove 43. This eliminates a possibility of an occurrence of side etching, thus enabling higher dimensional accuracy of a groove width, especially in a direction of the depth of the groove 43.

Preferably, the gap layer 45 is formed of a single-layer film composed of one of Au, Pt, Rh, Pd, Ru, Cr, a NiMo alloy, a NiW alloy, a NiP alloy, and NiPd alloy, or a multi-layer film wherein two or more different single layer films are laminated. All the above constituents are nonmagnetic and are not magnetized, making themselves ideally suited for constituting a gap layer of a thin film magnetic head. These constituents are metallic and can be deposited in a groove 43 by an electroplating method using lower core layer 27 as an electrode. Hence, the gap layer 45 can be securely formed in the groove main body 51 of the groove 43, enabling the width of the gap layer 45 to agree with the width of the groove main body 51.

Preferably, the lower magnetic pole layer 44 and the upper magnetic pole layer 46 are formed of a single-layer film composed of one of a FeNi alloy, a FeNi alloy in which the concentration of Fe is higher than that of Ni, and a CoFeNi alloy, or a multi-layer film wherein two or more different single-layer films are laminated. All these constituents are magnetic materials featuring outstanding soft magnetic characteristics, making themselves ideally suited for constituting a core of a thin film magnetic head. In addition, these constituents are metallic and can be deposited in a groove 43 by the electroplating method using lower core layer 27 as an electrode.

In the foregoing thin film magnetic head 41, recording current is applied to the coil 49, and the recording current causes a magnetic flux to be generated in the upper core layer 47 and the lower core layer 27. The magnetic flux is further applied to the upper magnetic pole layer 46 and the lower magnetic pole layer 44, and the magnetic flux leaks out through the gap layer 45, thus generating a leakage magnetic field. The leakage magnetic field magnetizes a magnetic recording medium to thereby record a recording signal.

A manufacturing method for a thin film magnetic head in accordance with the present invention will now be described.

The manufacturing method for a thin film magnetic head in accordance with the present invention includes the steps of planarizing the top surface of the lower core layer 27 by polishing it, depositing the insulation layer 42 on the lower core layer 27, forming the groove 43 in the magnetic pole tip region X of the insulation layer 42, depositing the lower magnetic pole layer 44, the gap layer 45, and the upper magnetic pole layer 46 in the groove 43, and forming the upper core layer 47 to be joined to the upper magnetic pole layer 46.

Figure 10:
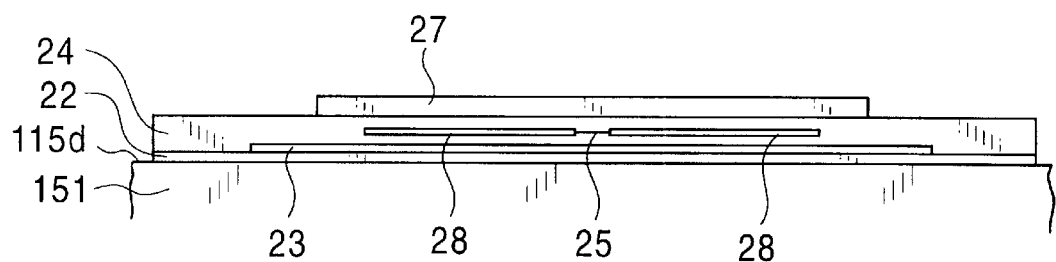
FIG. 10 is a diagram for describing the manufacturing method for a thin film magnetic head, in accordance with the present invention and, more particularly, the diagram is a front view of a composite thin film magnetic head.

Referring first to FIG. 10, the substrate insulation layer 22, the lower shield layer 23, the magnetoresistive device 25, the electrodes 28 and 28, and the read gap layer 24 are formed in order on the end surface 151d of the slider 151. Then, the lower core layer (or the upper shield layer) 27 is formed on the read gap layer 24.

Figure 11:
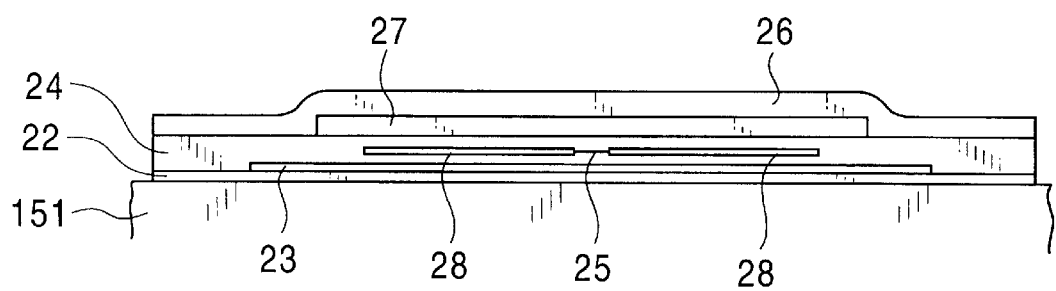
FIG. 11 is a diagram for describing the manufacturing method for a thin film magnetic head, in accordance with the present invention and, more particularly, the diagram is a front view of the composite thin film magnetic head.

In the next step, as illustrated in FIG. 11, the upper shield planarizing gap layer 26 that covers the read gap layer 24 and the lower core layer 27 is formed.

Figure 12:
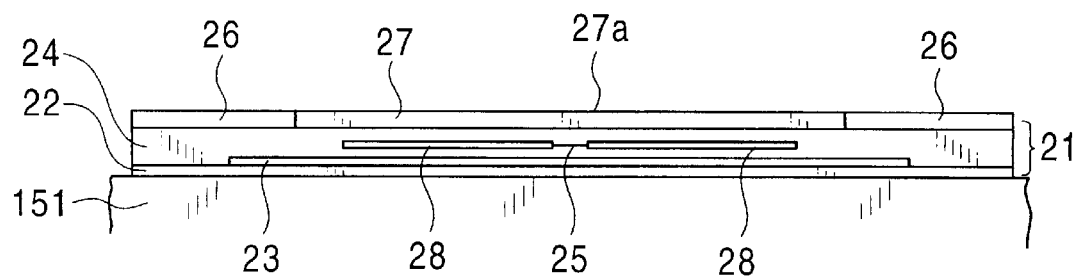
FIG. 12 is a diagram for describing the manufacturing method for a thin film magnetic head, in accordance with the present invention and, more particularly, the diagram is a front view of the composite thin film magnetic head.

Subsequently, as shown in FIG. 12, the top surface of the upper shield planarizing gap layer 26 is polished to expose the top surface 27a of the lower core layer 27, and the top surface 27a is polished to smooth it. The polishing can be performed by means such as chemical mechanical polishing (CMP) or the like.

Preferably, the flatness of the top surface 27a ranges from 0.001 $\mu$m to 0.015 $\mu$m in terms of surface roughness.

At this point, the read magnetic head 21 is completed.

The top surface 27a of the lower core layer 27 is polished to planarize the insulation layer, which is deposited thereon in a subsequent step, so as to permit the groove to be accurately formed by anisotropic etching. This allows the recording track width to be reduced.

Figure 13:
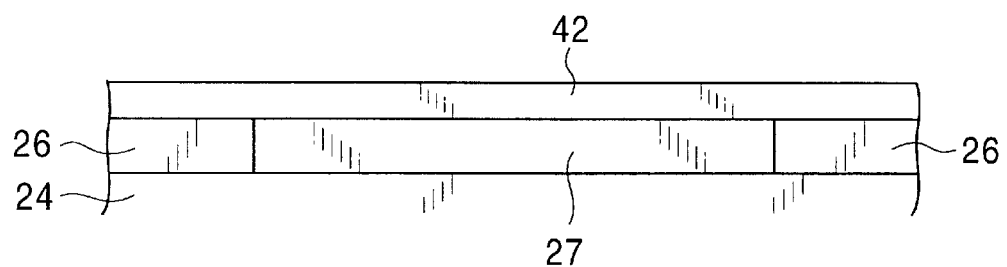
FIG. 13 is a diagram for describing the manufacturing method for a thin film magnetic head, in accordance with the present invention and, more particularly, the diagram is a front view of the thin film magnetic head.

In the next step, as shown in FIG. 13, the insulation layer 42 that covers a part of the upper shield planarizing gap layer 26 and the lower core layer 27 is deposited. The insulation layer 42 is formed of a single-layer film composed of one of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN, or a multi-layer film wherein two or more different single layer films are laminated. The deposition is performed by means such as sputtering, CVD, or vapor deposition. Preferably, the thickness of the insulation layer 42 ranges from 0.5 to 2 $\mu$m.

Figure 14:
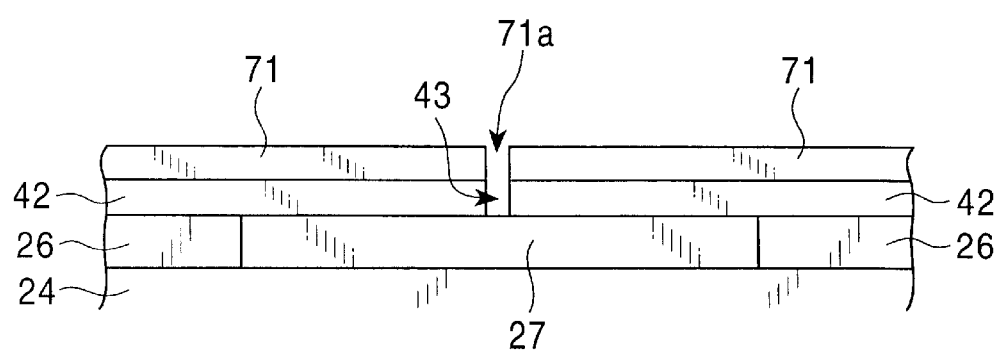
FIG. 14 is a diagram for describing the manufacturing method for a thin film magnetic head, in accordance with the present invention and, more particularly, the diagram is a front view of the thin film magnetic head.

Referring now to FIG. 14, a mask layer 71 is formed on the insulation layer 42, a pattern 71a is formed on the mask layer 71 by photolithography, and the insulation layer 42 exposed through the pattern 71a is subjected to anisotropic etching to form the groove 43. As a means for performing the anisotropic etching, reactive ion etching (hereinafter referred to simply as "RIE") can be ideally used.

In this case, the mask layer 71 preferably has a thickness ranging from 0.5 $\mu$m to 3 $\mu$m, and is comprised of one of a photoresist layer, a metal film layer, a laminate of a photoresist layer and a metal film layer, and a metal oxide layer.

The photoresist layer may be a standard positive or negative photoresist, or a photoresist that can be exposed by far ultraviolet rays, electron beams, X-rays, ion beams, etc. The metal film layer is preferably composed of one of Ti, Zr, Nb, Ta, Cr, Mo, W, Ru, Co, Rh, Ir, Ni, Pd, Pt, Au, Al, In, and Si, and may be formed of a single-layer film or a multi-layer film composed of the single-layer films. The metal oxide layer is preferably composed of one of or two or more of SiO, $SiO_2$, TaO, $Ta_2O_5$, TiO, SiN, $Si_3N_4$, CrO, WO, ZrO, NiO, AlO, and IrO, and may be formed of a single-layer film or a multi-layer film composed of the single-layer films.

A reactant gas used for forming the groove 43 by the RIE method is preferably composed of one or more of $CF_4$, a mixed gas of $CF_4$ and $O_2$, $C_2F_6$, a mixed gas of $C_2F_6$ and $O_2$, $C_4F_8$, a mixed gas of $C_4F_8$ and $O_2$, $Cl_2$, $BCl_3$, a mixed gas of $Cl_2$ and $BCl_3$, $CHF_3$, and a mixed gas of $CHF_3$ and Ar. Among these reactant gases, a best suited one is selected based on constituents of the insulation layer 42 and the mask layer 71.

Figure 6:
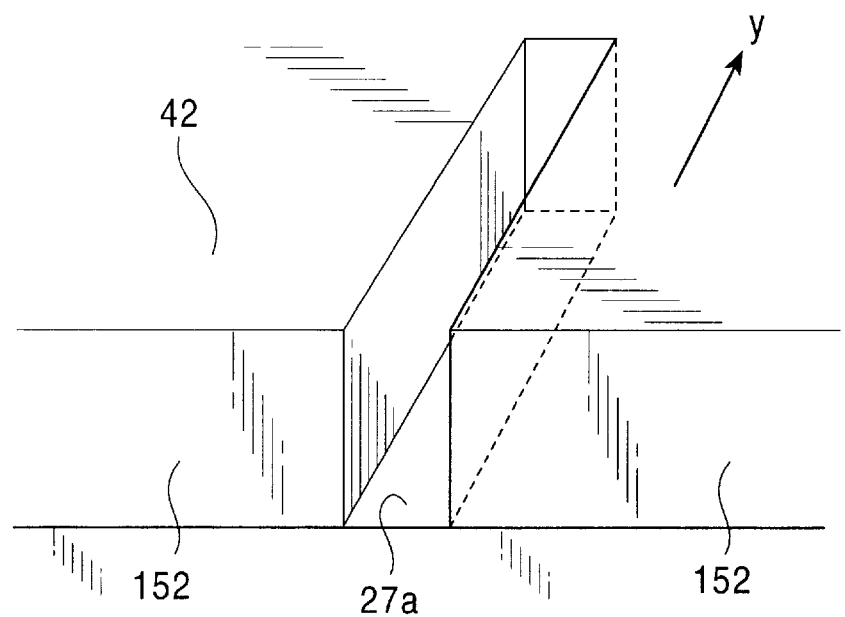
FIG. 6 is a diagram for describing a manufacturing method for a thin film magnetic head, in accordance with the present invention and, more particularly, the diagram is a perspective view showing an essential section of a magnetic pole tip region of the thin film magnetic head.

As shown in FIG. 6, the formed groove 43 is extended from the medium opposing surface 152 toward the back region Y (a direction indicated by an arrow "y" in the drawing), the top surface 27a of the lower core layer 27 being exposed at a bottom surface of the groove. The width of the groove 43 is 1 $\mu$m or less, and preferably, 0.5 $\mu$m or less.

Figure 15:
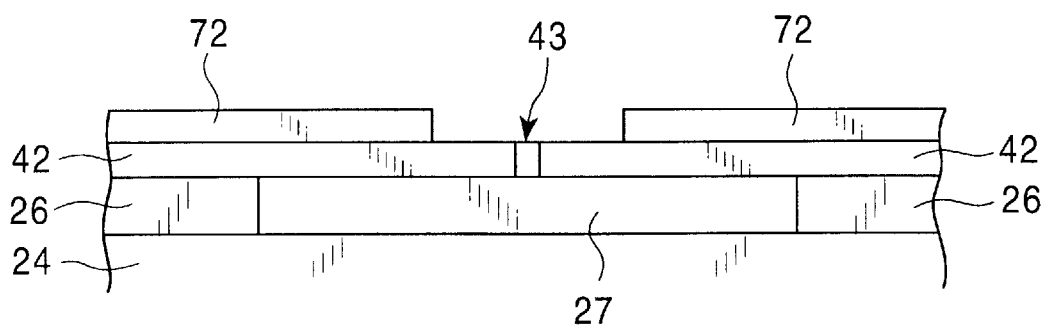
FIG. 15 is a diagram for describing the manufacturing method for a thin film magnetic head, in accordance with the present invention and, more particularly, the diagram is a front view of the thin film magnetic head.

In the subsequent step, as shown in FIG. 15, the mask layer 71 is removed, and a protective layer 72 is formed. The protective layer 72 is formed to cover the insulation layer 42, excluding an area around the groove 43.

Figure 7:
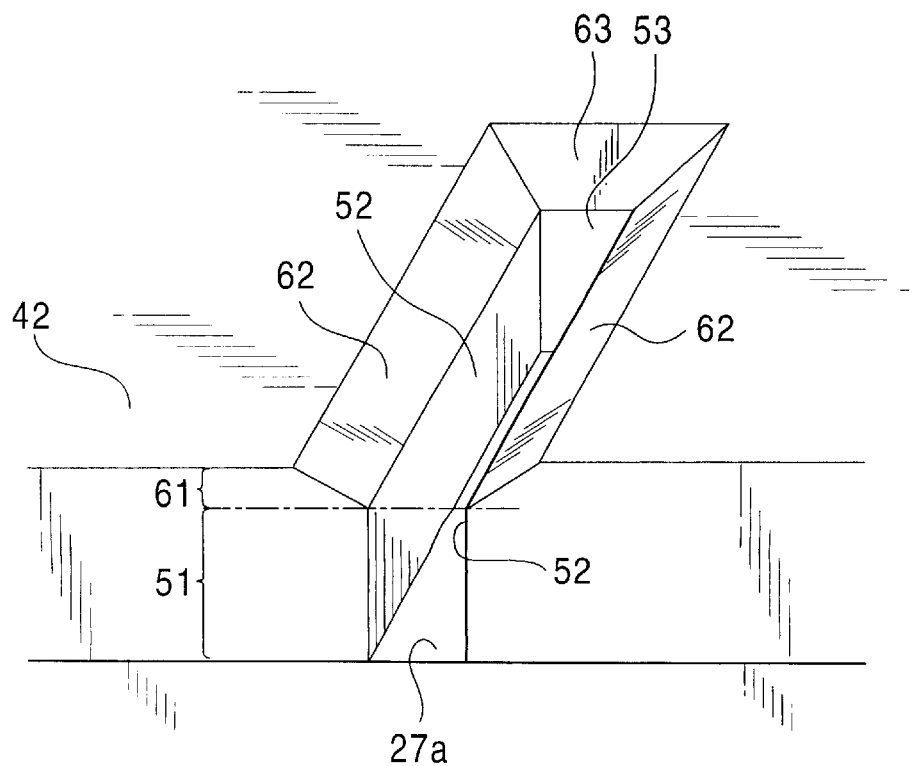
FIG. 7 is a diagram for describing a manufacturing method for a thin film magnetic head, in accordance with the present invention and, more particularly, the diagram is a perspective view showing an essential section of a magnetic pole tip region of the thin film magnetic head.
Figure 16:
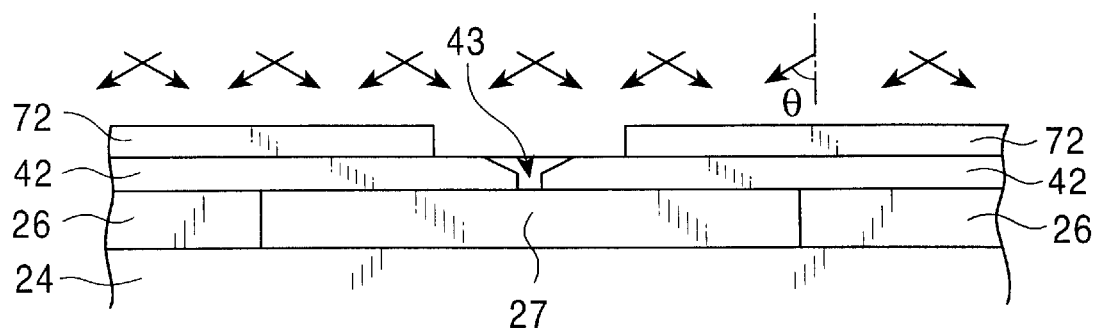
FIG. 16 is a diagram for describing a manufacturing method for a thin film magnetic head, in accordance with the present invention and, more particularly, the diagram is a front view of the thin film magnetic head.

Then, as shown in FIGS. 16 and 7, by a physical ion beam etching method (an ion milling method using a rare gas, such as Ar), the top surface of the insulation layer 42 and a connected portion of the groove 43 are etched to form the slant surfaces 62 and 62 near the side walls, and the magnetic pole tip slant surface 63 in the groove 43.

An irradiating angle e of the ion beams for the etching should be 30°≦θ≦70°. Preferably, the etching is performed while rotating the slider 151.

The slant surfaces 62 and 62 near the side walls and the magnetic pole tip slant surface 63 are formed aslant at a predetermined angle with respect to the top surface 27a of the lower core layer 27 due to a shadow effect, which is an interaction of the protective layer 72 formed excluding the area round the groove 43 and the ion beams.

Figure 17:
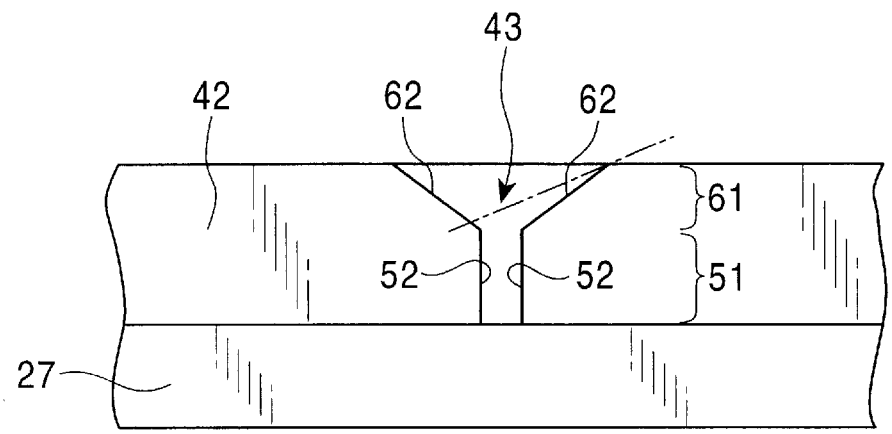
FIG. 17 is a diagram for describing the manufacturing method for a thin film magnetic head, in accordance with the present invention and, more particularly, the diagram is a front view showing an essential section of a magnetic pole tip region of the thin film magnetic head.
Figure 18:
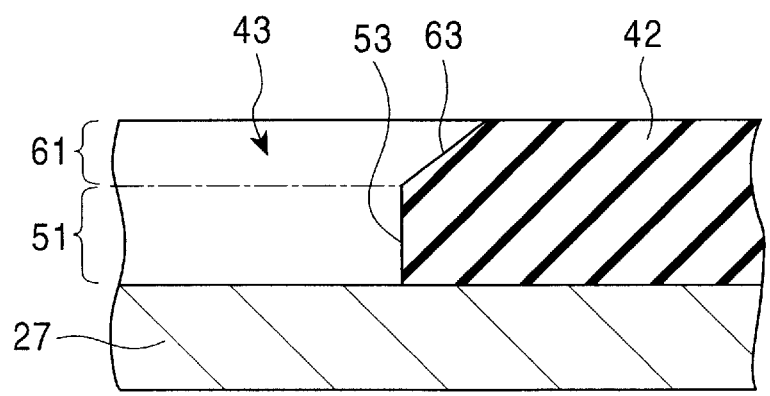
FIG. 18 is a diagram for describing the manufacturing method for a thin film magnetic head, in accordance with the present invention and, more particularly, the diagram is a side sectional view showing an essential section of the magnetic pole tip region of the thin film magnetic head.

The slant surfaces 62 and 62 near the side walls and the magnetic pole tip slant surface 63 are formed as described above so as to provide the groove 43 with the groove main body 51 adjacent to the lower core layer 27, and the slant portion 61 adjacent to the top surface of the insulation layer 42 (near the upper core layer 47) as shown in FIGS. 7, 17, and 18.

As the means for forming the groove main body 51 and the slant portion 61, a method described below can be employed.

Figure 30:
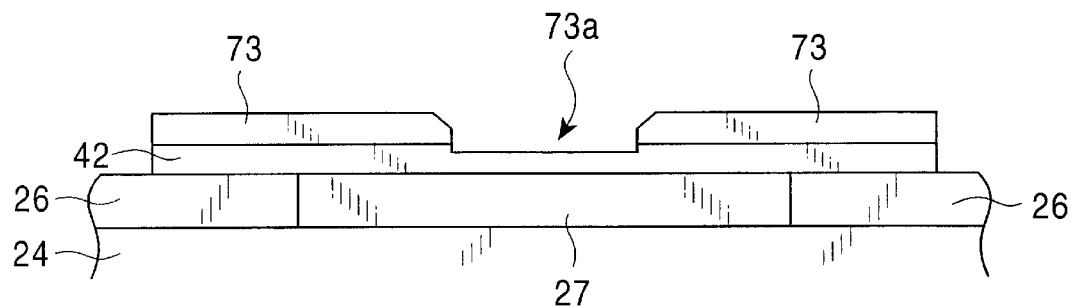
FIG. 30 is a diagram for describing another embodiment of a manufacturing method for a thin film magnetic head, in accordance with the present invention and, more particularly, the diagram is a front view showing the thin film magnetic head.

First, the insulation layer 42 is deposited in the same manner as that illustrated in FIG. 13, then a mask layer 73 is formed on the insulation layer 42, and a pattern 73a is formed on the mask layer 73 by photolithography as shown in FIG. 30.

Figure 31:
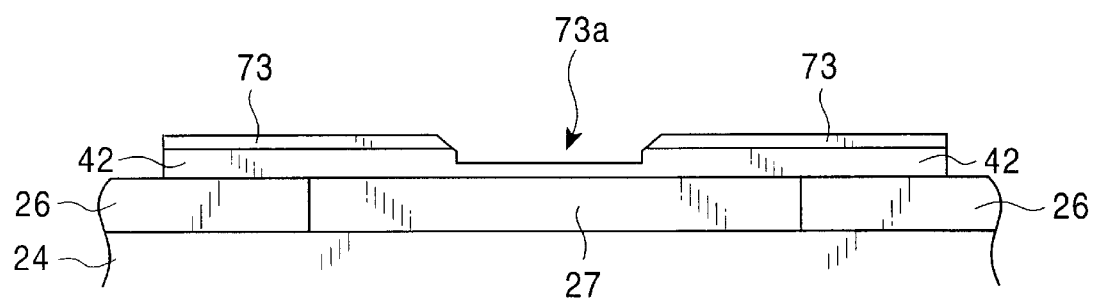
FIG. 31 is a diagram for describing another embodiment of the manufacturing method for a thin film magnetic head, in accordance with the present invention and, more particularly, the diagram is a front view showing the thin film magnetic head.
Figure 32:
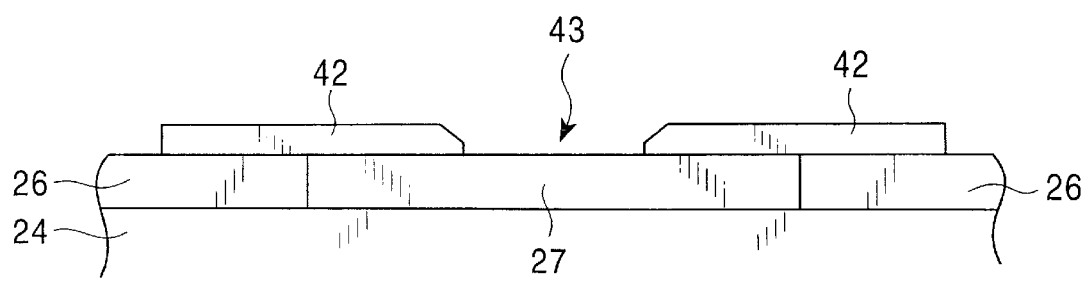
FIG. 32 is a diagram for describing another embodiment of the manufacturing method for a thin film magnetic head, in accordance with the present invention and, more particularly, the diagram is a front view showing the thin film magnetic head.
Figure 33:
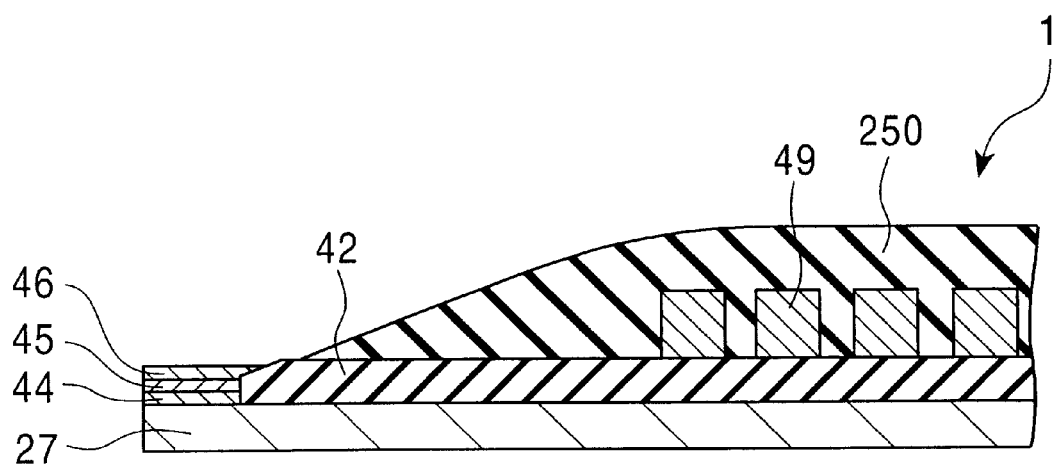
FIG. 33 is a diagram for describing another embodiment of the manufacturing method for a thin film magnetic head, in accordance with the present invention and, more specifically, the diagram is a side sectional view showing the thin film magnetic head.

Then, as shown in FIG. 31, the insulation layer 42 exposed through the pattern 73a is subjected to the RIE so as to thereby form the groove 43 as shown in FIG. 32.

A thickness of the mask layer 73 ranges from 0.5 $\mu$m to 4 $\mu$m, and the thickness is decided by an etching rate of the mask layer 73 in the RIE method and a thickness in which a width of the pattern 73a that will provide a magnetic recording track can be formed. The width dimension of the pattern 73a is preferably 2.0 $\mu$m or less if the width dimension of a magnetic recording track is 0.5 $\mu$m or less. Preferably, a material having substantially the same etching rate as that of a material used for the insulation layer 42 is selected for the mask layer 73. Preferably, the mask layer is composed of, for example, a photoresist layer.

The photoresist layer may be a standard positive or negative photoresist, or a photoresist that can be exposed by far ultraviolet rays, electron beams, X-rays, ion beams, or the like.

Referring to FIG. 30, the insulation layer 42 exposed through the pattern 73a is subjected to the RIE in which anisotropy is weaker than that of the RIE in FIG. 14 and which is closer to isotropic etching to perform etching on the insulation layer 42 at the bottom of the pattern 73a and corners of the pattern 73a in the mask layer 73.

After forming slant surfaces having a predetermined angle on the corners of the pattern 73a, the anisotropy of the RIE is restored to perform etching, as shown in FIG. 31, on the mask layer 73 and the insulation layer 42 at the bottom of the pattern 73a at the same time in order to form the groove 43 as shown in FIG. 32.

Thus, the isotropic RIE is carried out first, then the anisotropic RIE is carried out to thereby form the groove 43 having a slant surface configuration produced by transferring a slant pattern of the mask onto the insulation layer 42, making it possible to form the groove main body 51 and the slant portion 61 as shown in FIGS. 7, 16, 17, and 18.

In this method, RIE conditions are controlled in steps, wherein the anisotropy is weakened compared with that in the case of FIG. 14 to form the slant surface of the pattern 73a, then the anisotropy is restored to etch the mask layer 73 and the insulation layer 42. This makes it possible to simultaneously etch the groove 43 and peel or remove the mask layer 73 without causing a significant change in an atmosphere around the magnetic head. Hence, formation of the layers, controllability of film thickness, and reproducibility can be improved, and a number of steps can be decreased (e.g. a step of controlling a reactant gas atmosphere can be omitted), thus providing advantages including improved workability and higher productivity.

Figure 19:
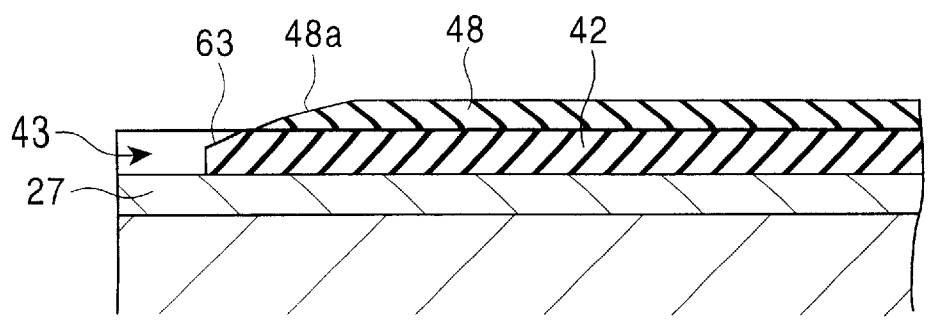
FIG. 19 is a diagram for describing the manufacturing method for a thin film magnetic head, in accordance with the present invention and, more particularly, the diagram is a side sectional view of the thin film magnetic head.

In the next step, as shown in FIG. 19, the coil insulation layer 48 is deposited on the insulation layer 42. A top surface of the coil insulation layer 48 that is adjacent to the magnetic pole tip region X is formed into a slant surface 48a that inclines toward the magnetic pole tip slant surface 63.

Subsequently, as shown in FIGS. 20, 21, 8, and 9, the lower magnetic pole layer 44, the gap layer 45, and the upper magnetic pole layer 46 are formed in the groove 43.

These layers 44, 45, and 46 are preferably formed by the electroplating method. It is particularly preferable to deposit constituents of the layers 44, 45, and 46 in this order by using the lower core layer 27 composed of a soft magnetic alloy as an electrode.

A major part of the lower core layer 27 is covered by the insulation layer 42; however, the top surface 27a of the lower core layer 27 is exposed at the bottom surface of the groove 43 as illustrated in FIG. 6. The lower magnetic pole layer 44, the gap layer 45, and the upper magnetic pole layer 46 are deposited on the exposed portion of the lower core layer 27, thus forming the layers only in the groove 43.

Figure 8:
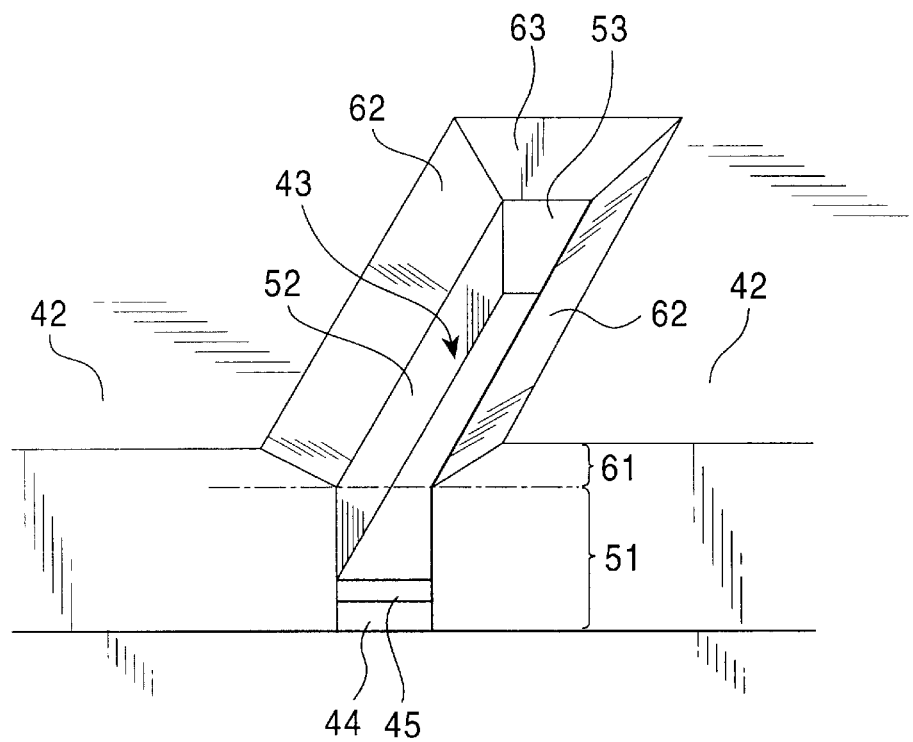
FIG. 8 is a diagram for describing the manufacturing method for a thin film magnetic head, in accordance with the present invention and, more particularly, the diagram is a perspective view showing an essential section of a magnetic pole tip region of the thin film magnetic head.

More specifically, as shown in FIG. 8, first, the lower magnetic pole layer 44 and the gap layer 45 are deposited in this order on the top surface 27a of the lower core layer 27 by the electroplating method. At this time, the thicknesses of the lower magnetic pole layer 44 and the gap layer 45 are adjusted so that they are positioned in the groove main body 51 of the groove 43. The thickness of the lower magnetic pole layer 44 ranges from 0.1 $\mu$m to 0.5 $\mu$m, and preferably, the thickness is 0.2 $\mu$m. The thickness of the gap layer 45 ranges from 0.1 $\mu$m to 0.3 $\mu$m, and preferably, the thickness is 0.2 $\mu$m.

Figure 9:
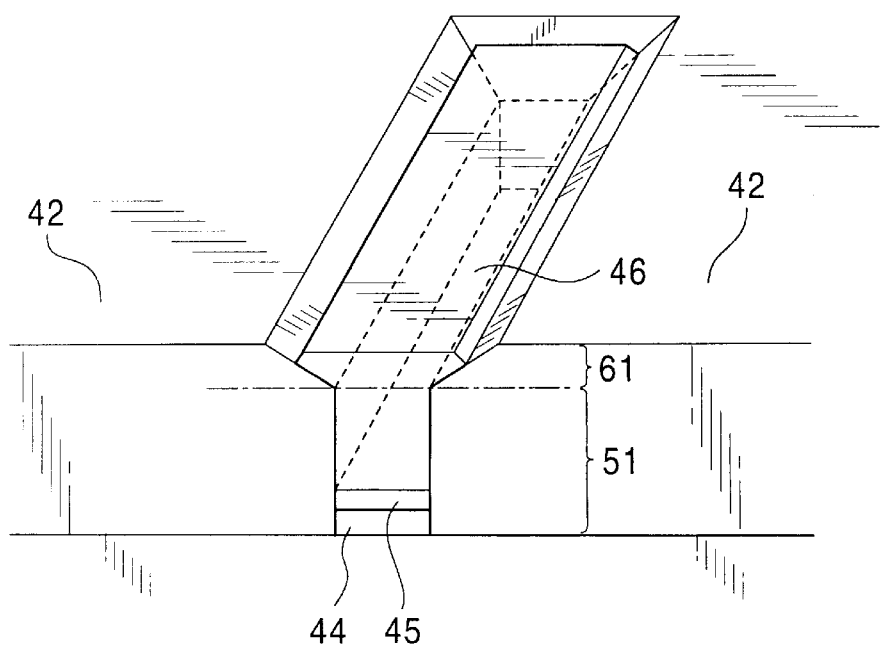
FIG. 9 is a diagram for describing the manufacturing method for the thin film magnetic head, in accordance with the present invention and, more particularly, the diagram is a perspective view showing an essential section of a magnetic pole tip region of the thin film magnetic head.

In the next step, as shown in FIG. 9, the upper magnetic pole layer 46 is deposited on the gap layer 45 by the electroplating method. At this time, the thickness of the upper magnetic pole layer 46 is adjusted so that the upper magnetic pole layer 46 is positioned, extending from the groove main body 51 of the groove 43 to the slant portion 61. The thickness of the upper magnetic pole layer 46 ranges from 0.2 $\mu$m to 3.0 $\mu$m, and preferably, the thickness is 1.0 $\mu$m.

Figure 20:
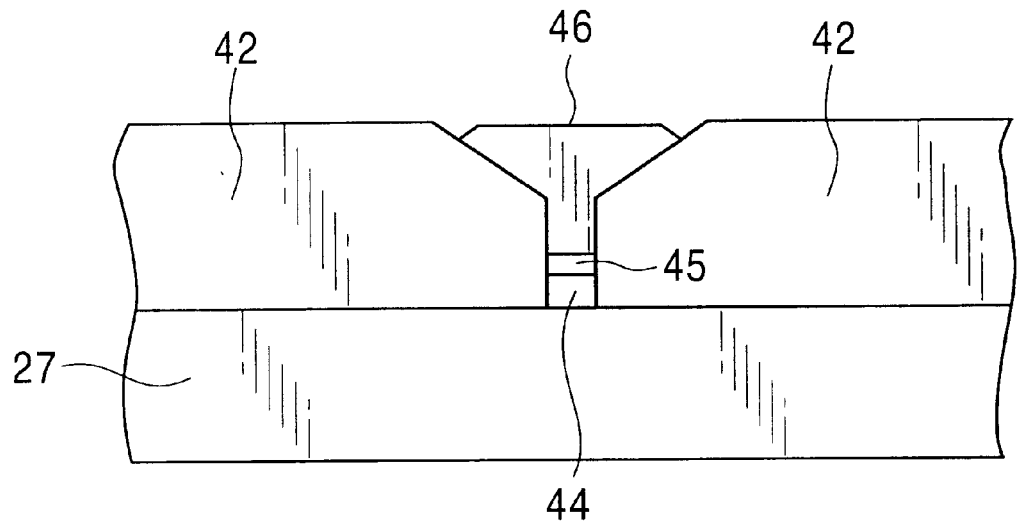
FIG. 20 is a diagram for describing the manufacturing method for a thin film magnetic head, in accordance with the present invention and, more particularly, the diagram is a front view showing an essential section of a magnetic pole tip region of the thin film magnetic head.
Figure 21:
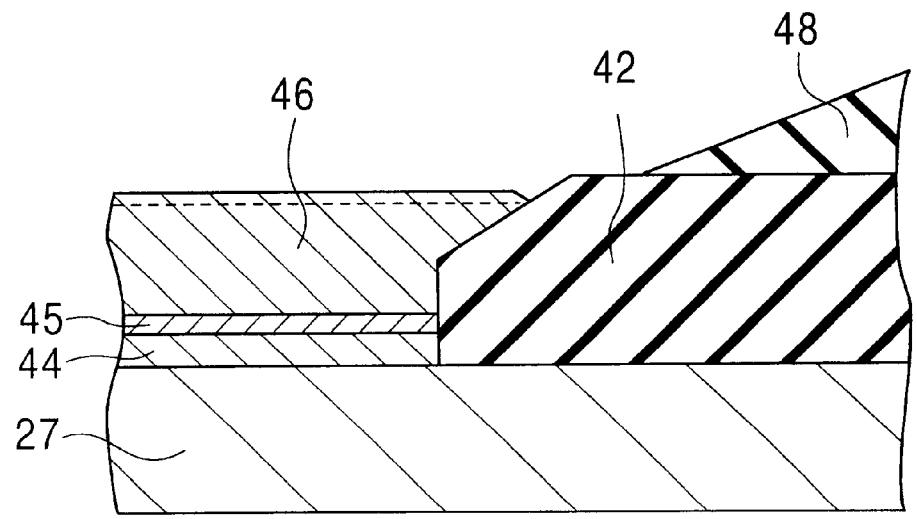
FIG. 21 is a diagram for describing the manufacturing method for a thin film magnetic head, in accordance with the present invention and, more particularly, the diagram is a side sectional view showing an essential section of the magnetic pole tip region of the thin film magnetic head.
Figure 34:
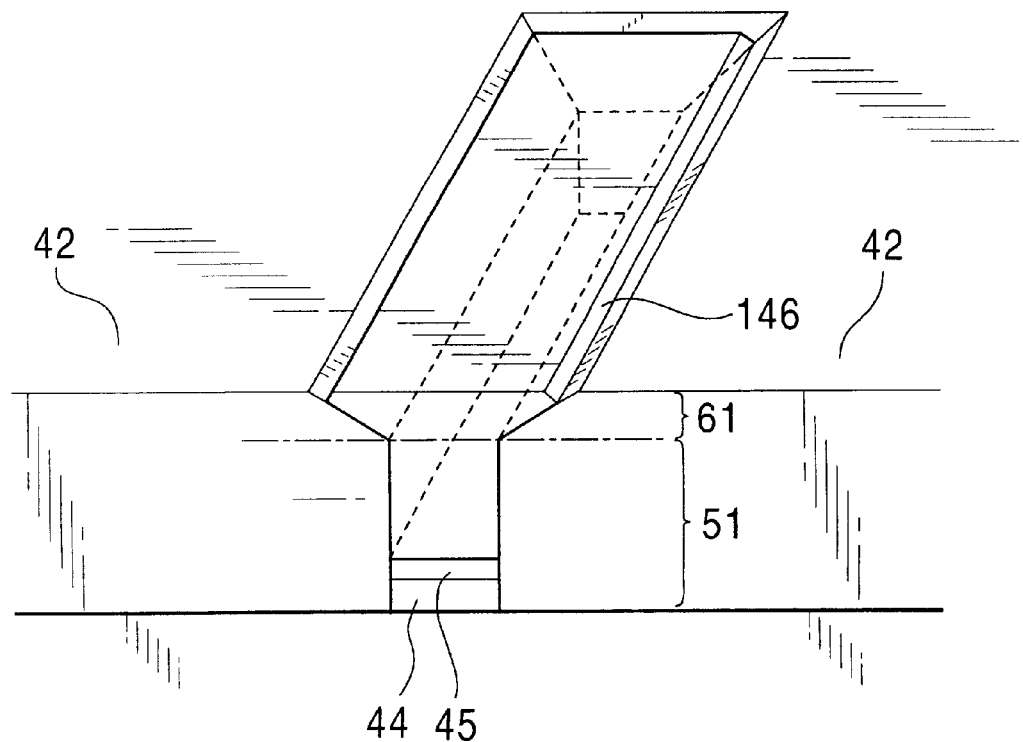
FIG. 34 is a diagram for describing another embodiment of the manufacturing method for a thin film magnetic head, in accordance with the present invention and, more specifically, the diagram is a perspective view showing an essential section of a magnetic pole tip region of the thin film magnetic head.
Figure 35:
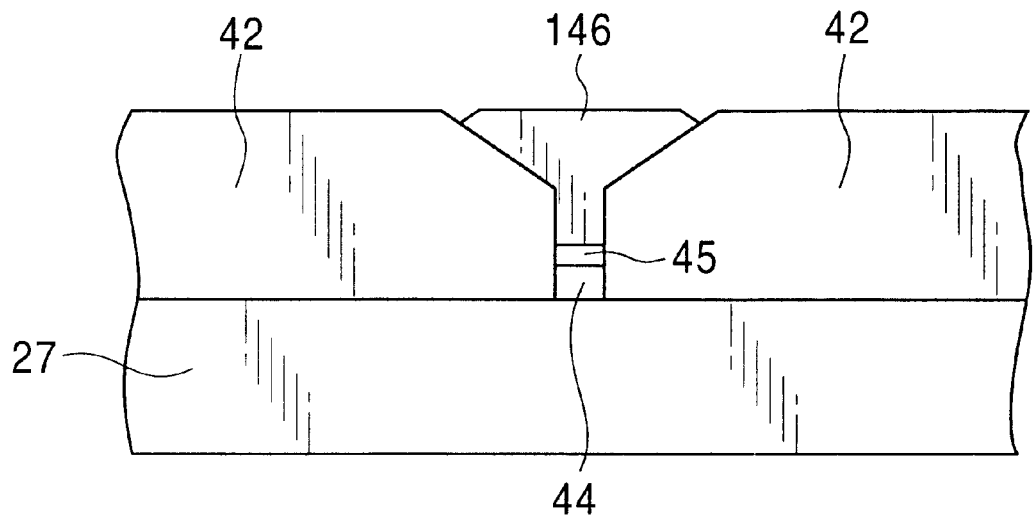
FIG. 35 is a diagram for describing another embodiment of the manufacturing method for a thin film magnetic head, in accordance with the present invention and, more particularly, the diagram is a front view showing an essential section of a magnetic pole tip region of the thin film magnetic head.
Figure 36:
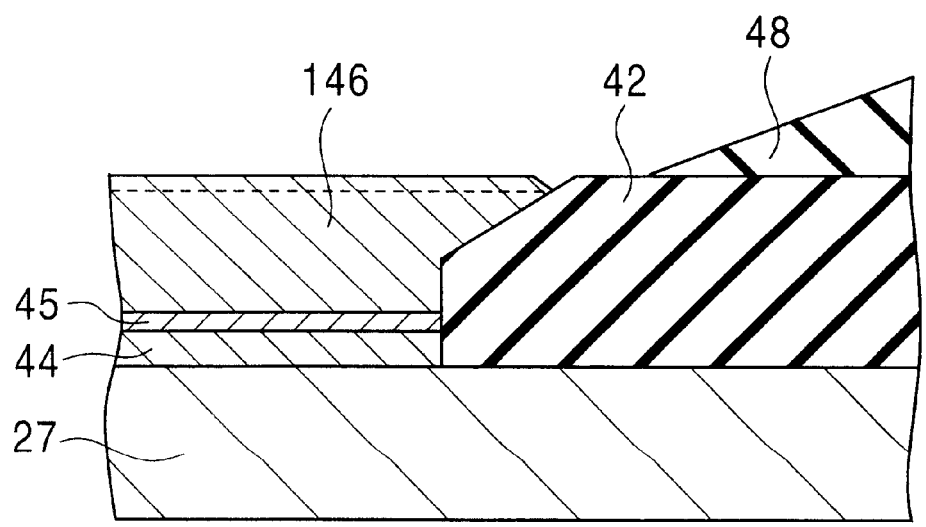
FIG. 36 is a diagram for describing another embodiment of the manufacturing method for a thin film magnetic head, in accordance with the present invention and, more particularly, the diagram is a side sectional view showing an essential section of a magnetic pole tip region of the thin film magnetic head.

Referring to FIGS. 9, 20, and 21, the upper magnetic pole layer 46 is formed so that it does not overflow the groove 43. However, a top surface of an upper magnetic pole layer 146 may be substantially flush with the top surface of the insulation layer 42 as shown in FIGS. 34, 35, and 36 as long as a part of the upper magnetic pole layer 46 is positioned on the slant portion 61.

To form the lower magnetic pole layer 44, the gap layer 45, and the upper magnetic pole layer 46 or 146 by the electroplating method, all the layers 44, 45, and 46 or 146 must be composed of metallic constituents. If any of the layers were composed of an insulating constituent, then an insulation layer would be formed, making it difficult to continue the electroplating.

Furthermore, the lower magnetic pole layer 44 and the upper magnetic pole layer 46 or 146 are required to be made of a soft magnetic constituent, and the gap layer 45 is required to be composed of a nonmagnetic constituent.

Accordingly, the lower magnetic pole layer 44 and the upper magnetic pole layer 46 or 146 are preferably formed of a single-layer film composed of one of a FeNi alloy, a FeNi alloy in which the concentration of Fe is higher than that of Ni, and a CoFeNi alloy, or a multi-layer film wherein two or more different single-layer films are laminated. The gap layer 45 is preferably formed of a single-layer film composed of one of Au, Pt, Rh, Pd, Ru, Cr, a NiMo alloy, a NiW alloy, a NiP alloy, and NiPd alloy, or a multi-layer film wherein two or more different single layer films are laminated.

The coil insulation layer 48 may be formed after forming the lower magnetic pole layer 44, the gap layer 45, and the upper magnetic pole layer 46 or 146 in the groove 43.

Figure 22:
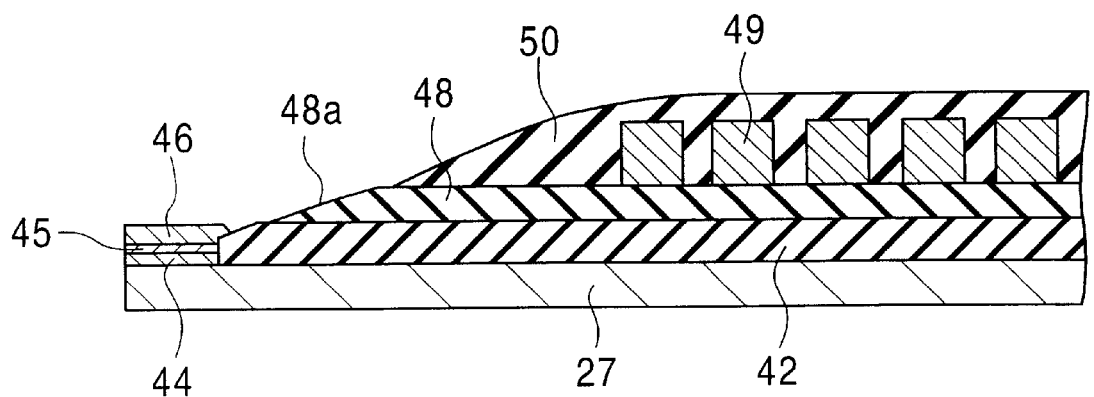
FIG. 22 is a diagram for describing the manufacturing method for a thin film magnetic head, in accordance with the present invention and, more particularly, the diagram is a side sectional view of the thin film magnetic head.

Then, as shown in FIG. 22, the coil 49 is formed on the coil insulation layer 48, and the upper insulation layer 50 that covers the coil 49 is deposited.

Figure 23:
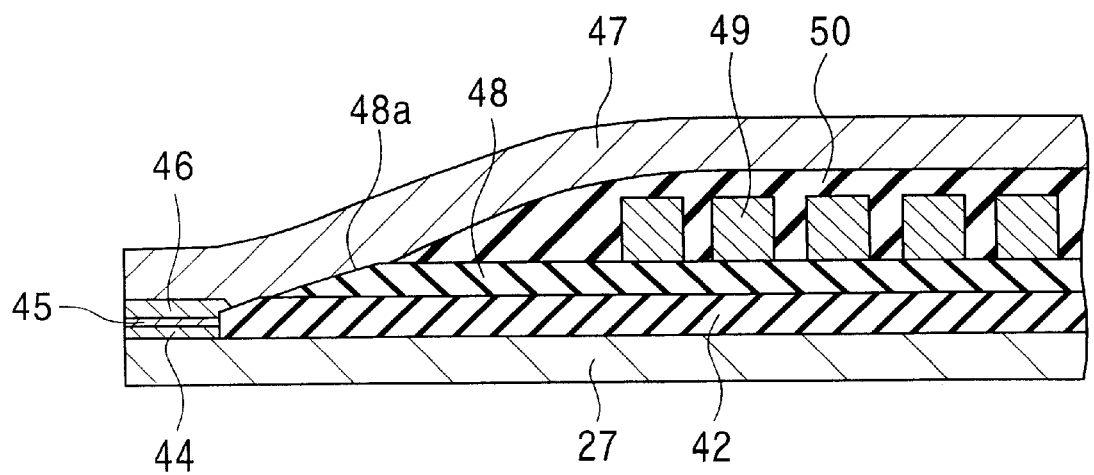
FIG. 23 is a diagram for describing the manufacturing method for a thin film magnetic head, in accordance with the present invention and, more particularly, the diagram is a side sectional view of the thin film magnetic head.

In the next step, as shown in FIG. 23, the upper core layer 47 covering the upper magnetic pole layer 46, the slant surface 48a of the coil insulation layer, and the upper insulation layer 50 is formed.

Figure 24:
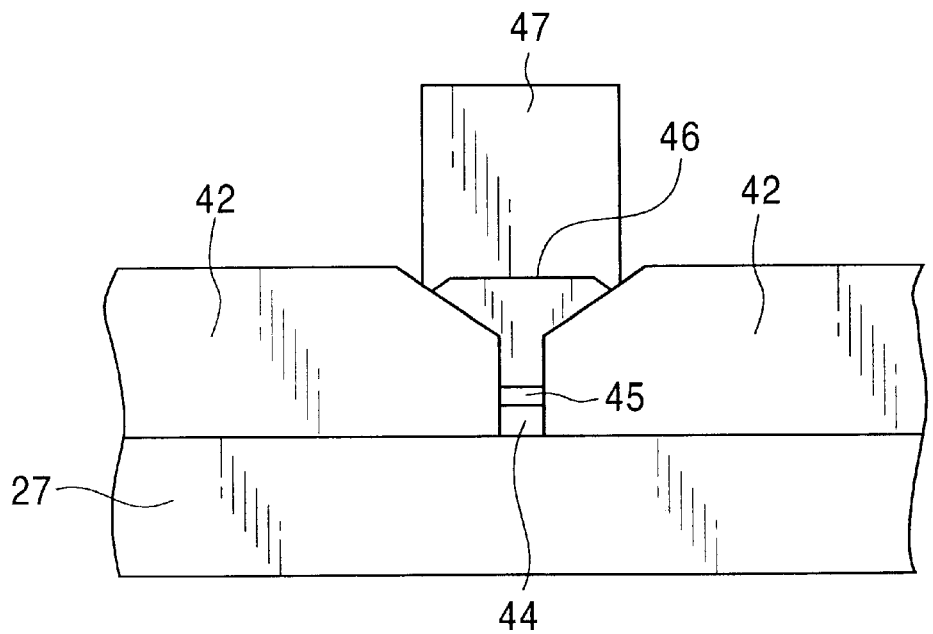
FIG. 24 is a diagram for describing the manufacturing method for a thin film magnetic head, in accordance with the present invention and, more particularly, the diagram is a front view showing an essential section of a magnetic pole tip region of the thin film magnetic head.
Figure 25:
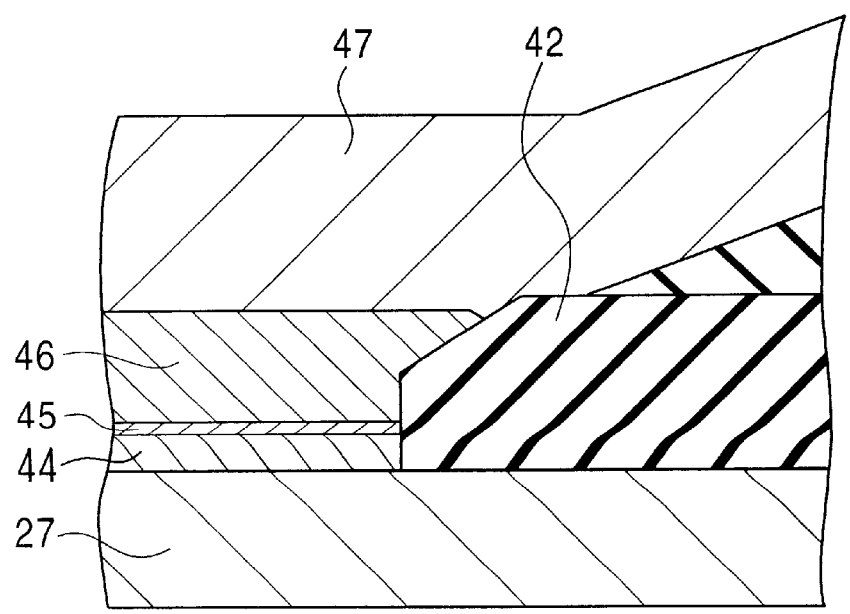
FIG. 25 is a diagram for describing the manufacturing method for a thin film magnetic head, in accordance with the present invention and, more particularly, the diagram is a side sectional view showing an essential section of the magnetic pole tip region of the thin film magnetic head.
Figure 37:
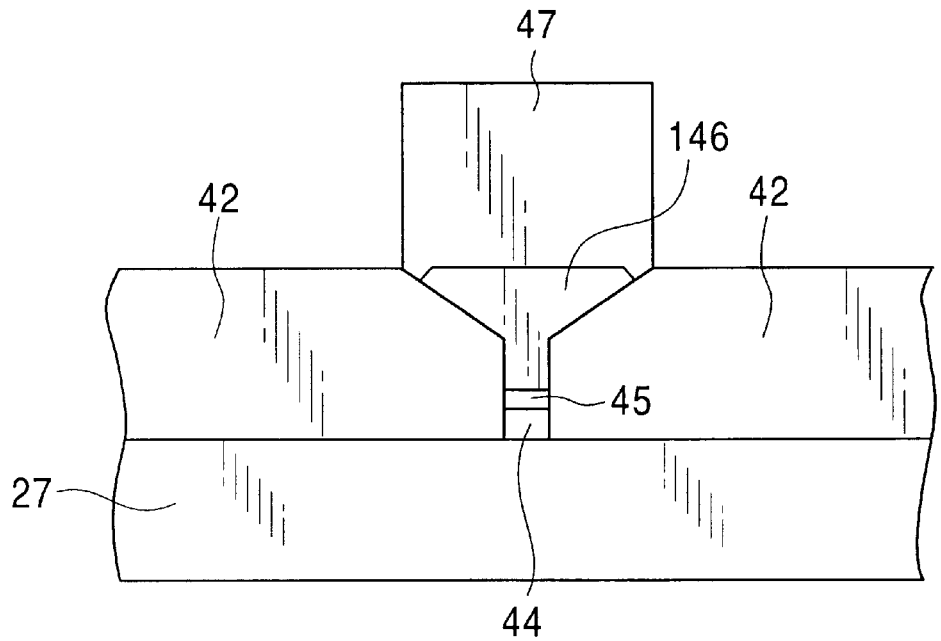
FIG. 37 is a diagram for describing another embodiment of the manufacturing method for a thin film magnetic head, in accordance with the present invention and, more particularly, the diagram is a front view showing an essential section of a magnetic pole tip region of the thin film magnetic head.
Figure 38:
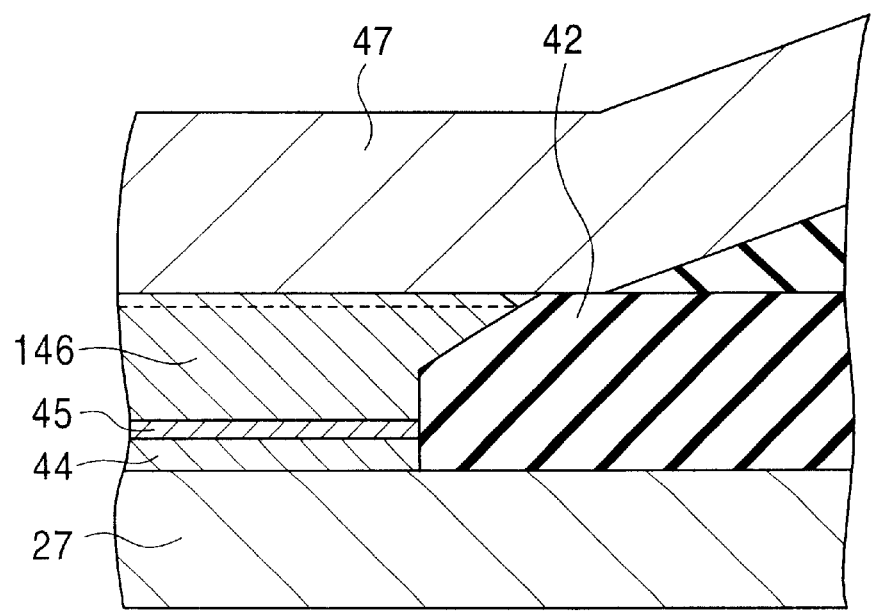
FIG. 38 is a diagram for describing another embodiment of the manufacturing method for a thin film magnetic head, in accordance with the present invention and, more particularly, the diagram is a side sectional view showing an essential section of the magnetic pole tip region of the thin film magnetic head.

Preferably, the upper core layer 47 is formed so that it completely covers the upper magnetic pole layer 46 and it is positioned in the slant portion 61 of the groove 43 in the direction of the magnetic recording track width as shown in FIGS. 24 and 25. When the top surface of the upper magnetic pole layer 146 is made virtually flush with the top surface of the insulation layer 42, it is also preferable that the upper core layer 47 is formed to fully cover the upper magnetic pole layer 146 as shown in FIGS. 37 and 38.

Subsequently, cutting at the medium opposing surface 152 is performed, and the medium opposing surface 152 is polished to make the thin film magnetic head 41 in accordance with the present invention.

Alternatively, as shown in FIG. 29, the coil 49 may be formed on the insulation layer 42, omitting the coil insulation layer 48, and the upper insulation layer 250 covering the insulating 42 and the coil 49 may be formed. In this case, the upper insulation layer 250 is preferably formed so that its top surface adjacent to the magnetic pole tip region X provides the slant surface that inclines toward the magnetic pole tip slant surface 63.

In the thin film magnetic head 41 described above, the lower magnetic pole layer 44, the gap layer 45, and the upper magnetic pole layer 46 are deposited in the groove 43, and the magnetic gap is formed, so that the layers are exposed on the medium opposing surface 152. Hence, the recording track width is identical to the width of the groove 43 at the medium opposing surface 152, thus permitting the recording track width to be reduced. In addition, the leakage magnetic field generated through the magnetic gap allows efficient magnetic recording on a magnetic recording medium.

The gap depth of the magnetic gap is defined by a distance from the medium opposing surface 152 to the magnetic pole tip surface 53 of the groove main body 51, and a part of the lower magnetic pole layer 44, the gap layer 45, and the upper magnetic pole layer 46 that constitute the magnetic gap is deposited in the groove main body 51, thus eliminating a possibility of variations in the gap depth.

Moreover, in the thin film magnetic head 41 described above, the upper magnetic pole layer 46 is deposited over the groove main body 51 and the slant portion 61 and joined to the upper core layer 47, so that the tapered portion 46a is formed on the upper magnetic pole layer 46 at the upper core layer 47 side. The presence of the tapered portion 46a ensures smooth flow of magnetic fluxes between the upper core layer 47 and the upper magnetic pole layer 46, preventing the magnetic fluxes from leaking at a junction between the upper core layer 47 and the upper magnetic pole layer 46.

Furthermore, the width of the groove main body 51 can be set to 1 μm or less, and more preferably to 0.5 μm or less. Thus, the recording track width can be set to 1 μm or less.

Thus, as described in detail above, in the thin film magnetic head in accordance with the present invention, an insulation layer is deposited on a lower core layer, the insulation layer is provided with a groove, the groove is formed by a groove main body and a slant portion, a lower magnetic pole layer, a gap layer, and an upper magnetic pole layer are deposited in the groove, the lower magnetic pole layer is joined to the lower core layer, the upper magnetic pole layer is joined to the upper core layer, and the lower magnetic pole layer, the gap layer, and the upper magnetic pole layer constituting a magnetic gap are deposited in the groove main body formed beforehand. Hence, a recording track width is determined by a width of the groove main body. With this arrangement, the recording track width can be reduced by reducing the width of the groove main body.

In the thin film magnetic head according to the present invention, a gap depth of the magnetic gap is defined by a distance from a medium opposing surface to a magnetic pole tip surface of the groove main body, and a part of the lower magnetic pole layer, the gap layer, and the upper magnetic pole layer that constitute the magnetic gap is deposited in the groove main body, thus eliminating a possibility of variations in the gap depth.

Moreover, in the thin film magnetic head according to the present invention, the lower magnetic pole layer and the gap layer are positioned and deposited in the groove main body, and the upper magnetic pole layer is deposited over the groove main body and the slant portion. A tapered portion is formed on the upper magnetic pole layer at the upper core layer side. The presence of the tapered portion ensures smooth flow of magnetic fluxes between the upper core layer and the upper magnetic pole layer, preventing the magnetic fluxes from leaking at a junction between the upper core layer and the upper magnetic pole layer.

Furthermore, a part of the lower magnetic pole layer, the gap layer, and the upper magnetic pole layer is formed in the groove main body, and the width of the groove main body can be set to 1 μm or less, and more preferably to 0.5 μm or less. Thus, the recording track width can be set to 1 μm or less.

In the thin film magnetic head according to the present invention, the insulation layer, the lower magnetic pole layer, the gap layer, and the upper magnetic pole layer are exposed on the medium opposing surface. Hence, the recording track width in the medium opposing surface is identical to the width of the groove, thus permitting the recording track width to be reduced. In addition, the leakage magnetic field generated through the magnetic gap allows efficient magnetic recording on a magnetic recording medium.

The insulation layer is formed of a single-layer film composed of one of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN, or a multi-layer film wherein two or more different single layer films are deposited, hence, anisotropic etching can be carried out for forming the groove. This eliminates a possibility of an occurrence of side etching, thus enabling higher dimensional accuracy of a groove width especially in a direction of the depth of the groove.

The gap layer is formed of a single-layer film composed of one of Au, Pt, Rh, Pd, Ru, Cr, a NiMo alloy, a NiW alloy, a NiP alloy, and NiPd alloy, or a multi-layer film wherein two or more different single layer films are laminated. All these constituents are nonmagnetic and do not magnetize, making themselves ideally suited for constituting a gap layer of a thin film magnetic head. These constituents are metallic and can be deposited in a groove by an electroplating method using an underlying core layer as an electrode. Hence, the gap layer can be securely formed in the groove main body, enabling the width of the gap layer to agree with the width of the groove main body.

The composite thin film magnetic head, in accordance with the present invention is comprised of the read magnetic head equipped with the magnetoresistive device and the thin film magnetic head described above, these two magnetic heads being laminated. Using the composite thin film magnetic head with a magnetic recording apparatus of a computer or the like makes it possible to provide a magnetic recording apparatus featuring a high recording density and a large storage capacity.

According to the manufacturing method for a thin film magnetic head in accordance with the present invention, a top surface of the lower core layer is polished to planarize the top surface, an insulation layer is deposited on the lower core layer, a groove that extends from a medium opposing surface toward a back region in a magnetic pole tip region of the insulation layer is formed, a bottom surface of the groove is brought to reach the lower core layer, a lower magnetic pole layer, a gap layer, and an upper magnetic pole layer are deposited in the groove, the lower core layer and the lower magnetic pole layer are joined, a coil is formed in the back region of the insulation layer and the coil is joined to the upper magnetic pole layer in the magnetic pole tip region, and the upper core layer that covers a part of the coil in the back region is formed. Thus, the lower magnetic pole layer, the gap layer, and the upper magnetic pole layer form a magnetic gap. A recording track width is decided by a width of the groove, and the width of the groove can be set to 1 $\mu$m or less, and more preferably 0.5 $\mu$m or less. Hence, the recording track width can be made smaller than that of a conventional thin film magnetic head. Moreover, since the lower core layer is polished to be planarized, the insulation layer to be deposited in a subsequent step is planarized. This makes it possible to accurately form the groove by the anisotropic etching, permitting a recording track width to be reduced.

The groove is formed by performing anisotropic etching on the insulation layer. This prevents an occurrence of side etching, enabling dimensional accuracy of a groove width in relation to a direction of a groove depth to be improved.

The lower magnetic pole layer, the gap layer, and the upper magnetic pole layer are formed by an electroplating method using the lower core layer as an electrode. Hence, the lower magnetic pole layer, the gap layer, and the upper magnetic pole layer can be securely formed in the groove.

What is claimed is:

1. A thin film magnetic head comprising: an upper core layer and a lower core layer that extend from a back region toward a magnetic pole tip region, end surfaces thereof being exposed on a medium opposing surface, and the upper core layer and the lower core layer being magnetically connected in the back region; and a gap layer provided between the upper core layer and the lower core layer in the magnetic pole tip region, wherein an insulation layer is deposited on the lower core layer;

a groove extending from the medium opposing surface toward the back region is provided in the magnetic pole tip region of the insulation layer;

the groove is composed of a groove main body that opens to the lower core layer, the upper core layer, and the medium opposing surface, and a slant portion formed in the opening of the groove main body that is adjacent to the upper core layer;

a lower magnetic pole layer, the gap layer, and an .upper magnetic pole layer are deposited in the groove; and the lower magnetic pole layer is joined to the lower core layer, while the upper magnetic pole layer is joined to the upper core layer, the upper magnetic pole layer forming an upper magnetic pole tip, while the lower magnetic pole layer forming a lower magnetic pole tip.

2. A thin film magnetic head according to claim 1, wherein the groove main body comprises two side walls that are installed in a standing manner on the lower core layer and reach the medium opposing surface, and a magnetic pole tip surface that connects the two side walls at a location adjacent to the back region of the groove main body and defines gap depths of the upper magnetic pole tip and the lower magnetic pole tip.

3. A thin film magnetic head according to claim 1, wherein the slant portion comprises two slant surfaces that continue to the two side walls and a magnetic pole tip slant surface that continues to the magnetic pole tip surface.

4. A thin film magnetic head according to claim 1, wherein the lower magnetic pole layer and the gap layer are positioned and deposited in the groove main body, and the upper magnetic pole layer is deposited such that it extends over the groove main body and the slant portion.

5. A thin film magnetic head according to claim 1, wherein a top surface of the lower core layer is polished.

6. A thin film magnetic head according to claim 1, wherein a gap between the two side walls of the groove main body is 1 $\mu$m or less.

7. A thin film magnetic head according to claim 2, wherein a slope angle of the slant surface adjacent to the side walls ranges from 10 to 80 degrees with respect to the lower core layer.

8. A thin film magnetic head according to claim 2, wherein a slope angle of the magnetic pole tip slant surface ranges from 10 to 80 degrees with respect to the lower core layer.

9. A thin film magnetic head according to claim 1, wherein the insulation layer, the lower magnetic pole layer, the gap layer, and the upper magnetic pole layer are exposed on the medium opposing surface.

10. A thin film magnetic head according to claim 1, wherein the insulation layer is formed of a single-layer film or a multi-layer film wherein two or more different single-layer films are laminated, wherein said single-layer film is composed of one selected from the group consisting of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN.

11. A thin film magnetic head according to claim 1, wherein the gap layer is formed of a single-layer film or a multi-layer film wherein two or more different single-layer films are laminated, wherein said single-layer film is composed of an element selected from the group consisting of Au, Pt, Rh, Pd, Ru, Cr, a NiMo alloy, a NiW alloy, a NiP alloy, and NiPd alloy.

12. A composite thin film magnetic head comprising the film magnetic head according to claim 1 laminated with a read magnetic head, said read magnetic head comprising a magnetoresistive device.

* * * * *